United States Patent [19]
Yoneyama et al.

[11] Patent Number: 5,952,659
[45] Date of Patent: Sep. 14, 1999

[54] THERMAL INFRARED IMAGE SENSOR

[75] Inventors: Toshikazu Yoneyama, Tsurugashima; Hitoshi Nomura, Kawasaki, both of Japan

[73] Assignee: Nikon Corporation, Japan

[21] Appl. No.: 08/955,100

[22] Filed: Oct. 22, 1997

[30] Foreign Application Priority Data

Oct. 22, 1996 [JP] Japan .................................. 8-298226

[51] Int. Cl.⁶ .................................................. H01L 27/146
[52] U.S. Cl. .................. 250/332; 250/338.4; 250/370.08
[58] Field of Search ................................ 250/332, 338.4, 250/370.08

[56] References Cited

U.S. PATENT DOCUMENTS

| | | | |
|---|---|---|---|
| 4,779,004 | 10/1988 | Tew et al. ................................ | 250/332 |
| 5,442,176 | 8/1995 | Eckel, Jr. et al. ........................ | 250/332 |
| 5,563,405 | 10/1996 | Woolaway, II et al. ................. | 250/332 |
| 5,650,622 | 7/1997 | Ookawa et al. .......................... | 250/332 |
| 5,811,808 | 9/1998 | Cannata et al. .......................... | 250/332 |

*Primary Examiner*—Constantine Hannaher
*Attorney, Agent, or Firm*—Klarquist Sparkman Campbell Leigh & Whinston, LLP

[57] ABSTRACT

A thermal type infrared image sensor is provided, the sensor including rows and columns of pixels forming a matrix, each pixel having a thermosensing element connected to a switch, vertical read lines connected to columns of pixels, a vertical reading circuit for extracting, in parallel, signals from rows of pixels in the matrix via the vertical read lines, an accumulator for accumulating signals output from the vertical reading circuit, a horizontal switching device and a horizontal scan circuit for sequentially and serially reading the accumulated signals.

58 Claims, 14 Drawing Sheets

THERMAL INFRARED IMAGE SENSOR

FIELD OF THE INVENTION

The present invention concerns a thermal infrared image sensor and, more particularly, concerns a signal-reading technique for obtaining an infrared image signal at low noise level, high sensitivity, and high speed utilizing a relatively simple sensor configuration.

BACKGROUND OF THE INVENTION

Quantum-type infrared image sensors and thermal infrared image sensors have been used for detecting infrared irradiation discharged from heat sources, such as from a human body, to obtain an infrared image of the heat source.

Previous quantum-type infrared image sensors typically include a thermal sensor made of a semiconductor material, such as HgCdTe. Such devices have both a narrow bandwidth and must be operated at a reduced temperature, e.g., about 77 K, typically by use of a liquid nitrogen source. Such a quantum-type infrared image sensor can obtain a minimum temperature resolution (Noise Equivalent Temperature Difference: NETD) of about 0.1 K. However, since the sensor device must be cooled by use of liquid nitrogen or the like, such sensor devices are large and expensive.

Thermal infrared sensors typically do not require such cooling. Thermal infrared image sensors typically include multiple pixels each comprising a thermosensing elements such as a bolometer. The thermal sensor detects changes in characteristic values (e.g., resistance values) of the thermosensing elements due to changes in the temperature, to produce an infrared image.

FIG. 5 shows a conventional thermal infrared image sensor comprising bolometers. The sensor shown in FIG. 5 includes nine pixels arranged in a matrix of three rows and three columns.

The pixels include vertical read switch elements (vertical switches) Qij (i=1–3, j=1–3) and thermosensing elements Rij (i=1–3, j=1–3), such as bolometers. Typically the bolometers have changeable resistances that vary with changes in temperature caused by infrared irradiation. The vertical switches, typically comprising MOS transistors, selectively output current signals received from the thermosensing elements Rij. When the vertical switches Qij are turned on, the current signals of the thermosensing elements Qij are read onto vertical signal lines.

A power supply voltage VRB is typically applied to one terminal of each thermosensing element Rij in each pixel. The other terminal of each thermosensing element Rij is connected to a drain of the corresponding vertical switch Qij. The source of each vertical switch Qij is connected to a vertical read line LVj (j=1–3) corresponding to each column of pixels.

Gates of the vertical switches Qij are typically connected to clock lines CL1, CL2, CL3 that are, in turn, connected to a vertical reading circuit VSR. When drive pulses are sequentially sent from the vertical reading circuit VSR to the clock lines CLi (i=1–3), the vertical switches Qij are sequentially turned on, row-by-row.

The vertical read lines LVj are connected to a horizontal read line LH through respective horizontal switches QHj (j=1–3). The horizontal read line LH is connected to an inverted input terminal of a current-voltage conversion amplifier AMP. A feedback resistor RF is connected between the inverted input terminal and the output of the amplifier AMP. A predetermined bias voltage VR is applied to a non-inverted input terminal of the amplifier AMP.

Gates of the horizontal switches QHj are connected to respective horizontal selection signal lines HSj (j=1–3) (horizontal lines). The horizontal lines HSj are connected to a horizontal scanning circuit HSR. The horizontal switches QHj are sequentially turned on by drive pulses sent from the horizontal scanning circuit HSR through the horizontal lines HSj, thereby performing a horizontal read operation.

To operate the thermal sensor shown in FIG. 5, the vertical reading circuit VSR turns on one row of the vertical switches (e.g., Q11, Q12, Q13) thereby selecting the corresponding thermosensing elements (R11, R12, and R13). The horizontal scanning circuit HSR sequentially turns on the horizontal switches QH1, QH2, and QH3. In this manner, the thermosensing elements R11, R12, R13 of the first row of pixels, are sequentially selected for horizontal scanning. Each of the thermosensing elements is sequentially selected to cause a current to flow.

More specifically, for example, a current flows from the power supply source VRB to the circuit of the horizontal read line LH via the thermosensing element R11, the vertical switch Q11, the vertical read line LV1, and the horizontal switch QH1. This current is then converted into a voltage signal by the current-voltage conversion circuit or amplifier AMP and the feedback resistor RF. The voltage signal is output from an output terminal VOUT. Since the thermosensing elements Rij have resistance values that change depending on temperature, a corresponding voltage signal output from the output terminal VOUT also varies with the temperature of each selected thermosensing element Rij.

As described above, signals are first read from the first row of pixels. In a sequential manner, signals of the second or next row are then read by the horizontal scanning circuit HSR. As currents flowing in the pixels are sequentially detected, an output signal representative of a thermal image corresponding to one screen is provided.

FIG. 6 illustrates another conventional thermal infrared image sensor of the prior art, wherein each thermosensing element of the sensor is configured as a bolometer. By way of example, the sensor shown in FIG. 6 includes nine pixels arranged in a matrix of three rows and three columns.

Each pixel 51 includes a bolometer RB serving as a thermosensing element. The bolometer RB has a resistance that changes as the temperature of the bolometer changes due to infrared irradiation. Additionally, each pixel includes a switch QP or a MOS transistor (p-type) operable to selectively output a current in the bolometer RB to each corresponding vertical read line 52a–52c. When the switch QP is turned on, the current signal is read from the bolometer RB.

A power supply voltage VRB is typically applied to one of the terminals of each bolometer RB. Drains of the switches QP are connected to the other terminal of each bolometer RB. Sources of the switches QP are typically connected to pixel columns via vertical read lines 52a–52c.

Gates of the switches QP are typically connected to each row of pixels and to clock lines 53a–53c. The clock lines 53a–53c are connected to a vertical reading circuit 54. Drive pulses φV1–φV3 are sent from the vertical reading circuit 54 to the switches QP and the switches QP are sequentially operated by pixel rows.

The vertical read lines 52a–52c are connected to a horizontal read line 56 through horizontal read switches (n-type MOS transistors) QH1–QH3. A current-voltage conversion circuit 58 (having an input intermittently grounded to a constant-voltage power supply VR) is connected to the horizontal read line 56. A current signal read from each pixel 51 onto the horizontal read line 56 is converted into a voltage signal by the current-voltage conversion circuit 58. The voltage signal is then sequentially output from an output terminal VO.

The gates of the horizontal read switches QH1–QH3 are connected to respective horizontal selection signal lines 55a–55c that are connected to a horizontal scanning circuit 57. The horizontal read operation of the pixels is controlled by drive pulses QH1–QH3 sent from the horizontal scanning circuit 57 to the horizontal read switches QH1–QH3. A parasitic capacitor CH is typically placed along the horizontal read line 56.

Operation of the thermal infrared image sensor shown in FIG. 6 is described with reference to a pulse timing chart shown in FIG. 7. Referring to FIG. 7, reading operations of the first row of pixels 51 (FIG. 6) are performed during periods t11 and t12. Reading operations for the second row of pixels 51 are performed during periods t21 and t22. Reading operations for the third row of pixels 51 are performed during periods t31 and t32.

The drive pulse $\phi V1$ is set to a low level during period t11, and the switches QP of the first row of pixels are turned on. During period t12, high-level drive pulses $\phi H1$–$\phi H3$ are sequentially sent from the horizontal scanning circuit 57 to sequentially turn on the horizontal read switches QH1–QH3. Since the switches QP of the first row of pixels 51 have been turned on, current signals from the first row of pixels 51 are sequentially read onto the horizontal read line 56 via the vertical read lines 52a–52c. The current signals are converted into voltage signals by the current-voltage conversion circuit 58, and the voltage signals are sequentially output to the output terminal VO.

A current signal IRB, output from each pixel 51, may be expressed by Equation 1 below. Because the horizontal read line 56 is intermittently grounded to the constant-voltage power supply VR:

$$IRB=(VR-VRB)/RB \qquad (1)$$

wherein RB is the resistance value of the respective bolometer RB.

When the resistance value RB of the bolometer changes with increases in temperature, the current signal IRB corresponding to the increase in temperature is output from each pixel 51.

During periods t11 and t12, drive pulses $\phi V2$ and $\phi V3$ are at a high level, and the switches QP of the second and third rows of pixels 51 remain in an OFF state. For this reason, current signals from the second and third rows of pixels 51 are not output. At the end of period t12, the drive pulse $\phi V1$ is set to a high level, the switches QP of the first row of pixels 51 are turned off, and the read operation for the first row of pixels 51 is completed.

The reading operation for the first row of pixels during periods t11 and t12 (described above) are similarly repeated for the second and third rows of pixels during periods t21 and t22 and periods t31 and t32, respectively. Following these operations, the reading operation with respect to all of the pixels is completed.

A pixel signal includes a background light component. In general, in prior-art thermal infrared image sensors, an NETD of about 0.1 K can be obtained. However, the background light component of the pixel adds heat of a level equal to about room temperature (i.e., about 300 K). In the prior art, the signal has been saturated by the background light component to amplify the signal; however, gain cannot be increased.

In order to avoid the above-described problem, the signal component and the background light component are separated by use of, for example, a differential amplifier placed outside the device. However, as is well known, the background light components of each of the pixels vary. Because prior-art methods of separating the signal component from the background light component occur outside the device, variations in the background light components of each of the pixels cannot be removed, and a fixed pattern of noise is generated.

In prior-art thermal infrared image sensors, a voltage is applied to both the ends of the bolometers serving as thermosensing elements to sequentially select the bolometers. Output current signals from the pixels are directly read on the horizontal read line. For this reason, when signals are read by the NTSC scheme (which serves as a standard television scheme having hundreds of thousands of pixels) a selective switching operation for pixels must be performed at several MHz. However, since time periods due to the resistances of the bolometers and floating capacitors CVj (j=1–3) of the read circuits (i.e., the vertical read line, the horizontal read line, and the like) are long, a high-speed read operation cannot be performed, and a read operation using the NTSC scheme has been difficult to obtain.

Previously, the resistance of each bolometer has been reduced to make it possible to realize high-speed reading. However, reducing the resistance has caused an increase in the current flowing in the bolometer, causing the elements themselves to generate heat. This element-generated heat serves as external disturbances to the ultimately produced thermal image. That is, such self-generated heat is equivalent to noise, and makes it impossible to detect a signal component at a high sensitivity level. Accordingly, a trade-off between the sensitivity and the reading speed has been established. That is, both the sensitivity and the reading speed cannot be optimized at the same time.

To solve the above difficulty, a plurality of reading circuits may be arranged, and the signals may be simultaneously read from the plurality of pixels, in parallel. However, the large number of signals must be processed with a peripheral circuit. The arrangement of the peripheral circuit is complicated and increases the cost of the sensor.

SUMMARY OF THE INVENTION

The present invention provides a thermal infrared image sensor that has a relatively simple configuration, can perform a high-speed operation at a high sensitivity level, and can obtain a thermal image signal with a low noise level.

The present invention provides, inter alia, a thermal infrared image sensor comprising a plurality of pixels respectively having thermosensing elements connected to switches. An image sensor, according to one embodiment, comprises a plurality of read lines to which a predetermined number of pixels of the plurality of pixels are connected, parallel read means for reading signals of the pixels respectively connected to the read lines onto the read lines one-by-one, accumulators for respectively accumulating signals read by the parallel read means onto the plurality of read lines, and a serial scan device for sequentially and serially reading the signals from the accumulator.

A thermal type infrared image sensor according to a second representative embodiment of the present invention includes a plurality of pixels each having a thermosensing element to output a current signal that is dependent upon changes in temperature, a plurality of vertical read lines each connected to a column of pixels, a buffer amplifier connected to each vertical read line for outputting current signals received from scanned pixels, offset compensators for compensating for offsets inherent in the buffer amplifiers, an integration circuit for integrating output currents received from the buffer amplifier (for a predetermined period of time) and to output corresponding voltage signals, and a serial scan device for sequentially and serially reading signals obtained by the integration circuit.

A thermal infrared image sensor according to a third representative embodiment of the present invention includes a plurality of pixels each having a thermosensing element to output current signals wherein the current is dependent upon changes in temperature; a plurality of vertical read lines each connected to a column of pixels; a buffer amplifier connected along each vertical read line to output current signals received from scanned pixels; a current-bias device for biasing the pixels through the buffer amplifiers; a background light-removing device operable to remove current components that correspond to background light of the current signals of the pixels; an integration circuit operable to integrate (for a predetermined period of time) current signals output from the buffer amplifiers after the background light components have been removed, so as to output corresponding voltage signals; and a serial scan device for sequentially and serially reading signals obtained by the integration circuit.

The foregoing and other objects, features, and advantages of the invention will become more apparent from the following detailed description of Representative Embodiments and Examples which proceed with reference to the accompanying drawings.

DETAILED DESCRIPTION OF THE INVENTION

Figure 1:
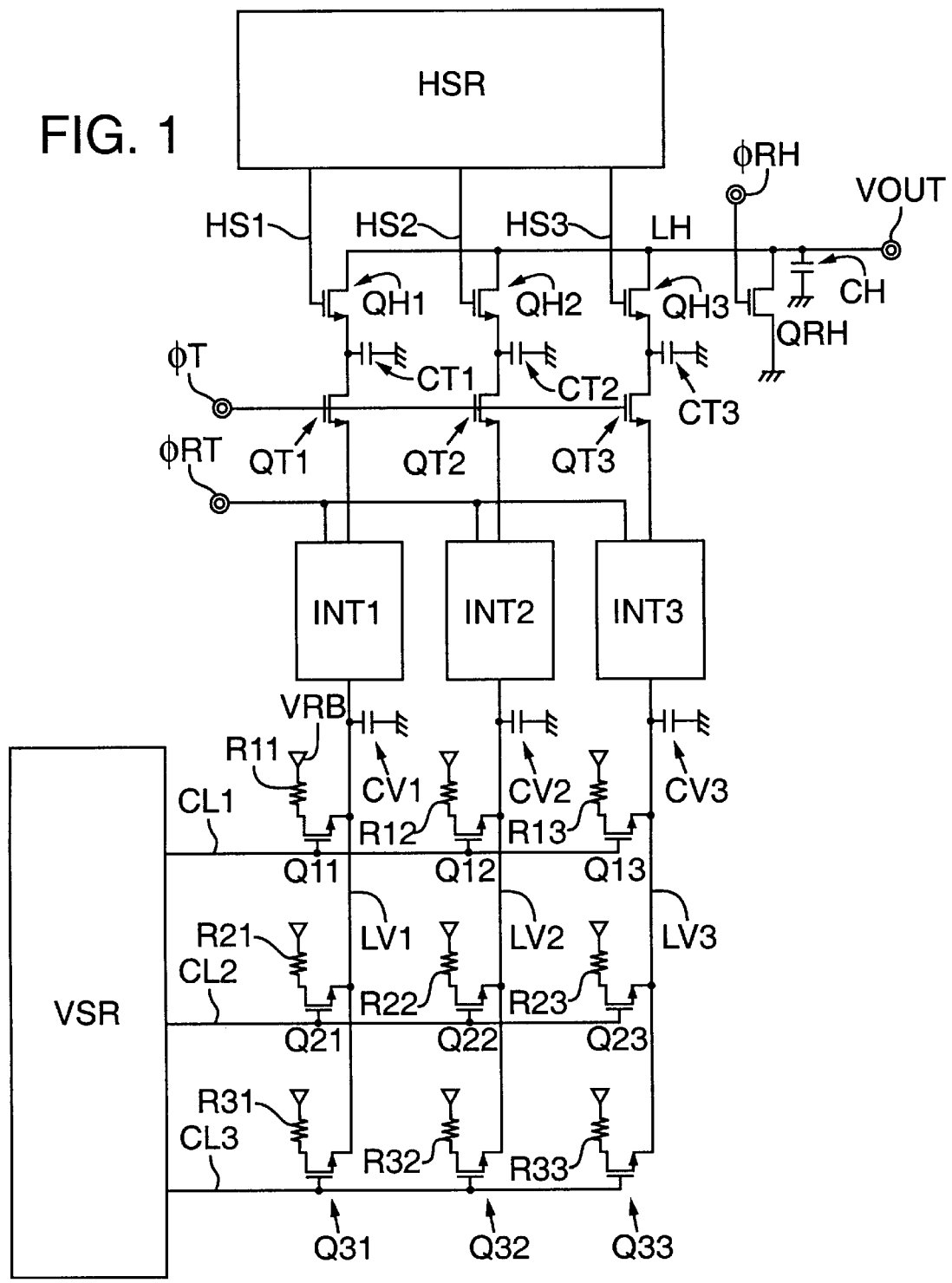
FIG. 1 is a schematic block circuit diagram of a first representative embodiment of the thermal infrared image sensor of the present invention.

A preferred embodiment of the thermal infrared image sensor of the present invention includes a plurality of pixels each having a thermosensing element connected to a respective switch, a plurality of read lines connected to a predetermined number of the pixels, a read device for reading (in parallel) signals of the pixels connected to the read lines onto the read lines one-by-one, an accumulator for accumulating signals read by the parallel-read device, and a serial scanning device to sequentially and serially read the signals from the accumulator.

Signals from the pixels are read in parallel onto the read lines one-by-one, and are then accumulated in the accumulator. Thereafter, the accumulated signals are sequentially and serially read. Accordingly, there is a sufficiently long period of time for reading the signals from the pixels onto the accumulator. Hence, a high-speed reading operation may be performed while avoiding the problem of the thermosensing elements themselves generating heat. Because the level of self-generated heat is low or non-existent, the noise level is significantly reduced.

A second representative embodiment of the thermal infrared image sensor of the present invention includes a matrix of pixels, each pixel having a thermosensing element connected to a respective switch. Vertical read lines are arranged in columns and connected to the respective columns of pixels. A vertical reading circuit extracts, in parallel via the vertical read lines, signals from respective rows of pixels. An accumulator accumulates signals of columns of pixels output from the vertical reading circuit. A horizontal scan device sequentially and serially reads the accumulated signals.

With the configuration of the second embodiment, signals are first read from one row of pixels in the matrix, and the signals are then accumulated by pixel columns. Thereafter, the accumulated signals are sequentially and serially read by the horizontal scan device. Accordingly, a sufficient period of time is allowed for the signals to be read from the pixels and to be accumulated. Even if the resistance values of the thermosensing elements are increased, required reading speeds are provided by the sensor of the present invention. Consequently, the noise level is reduced by avoiding heat generated by the thermosensing elements. In addition, since a conventional multi-line parallel read operation need not be performed, any peripheral circuit required by the sensor of the present invention is considerably simplified, and the cost of the sensor is relatively low.

Preferably, the vertical reading circuit is a current-voltage conversion circuit for converting currents in the thermosensing elements of the pixels into corresponding voltage signals. When the vertical reading circuit is a current-voltage conversion circuit, signal voltages are effectively accumulated in the accumulator, such as an accumulation capacitor, and a high signal/noise ratio is obtained.

Alternatively, the second embodiment of the sensor of the present invention may include a second accumulator for parallel accumulation of signals from the next row pixels, while the horizontal scan device sequentially reads the signals of the respective pixel columns from the accumulator. When the sensor includes a second accumulator, the signal reading operation from the pixels on the next row in the matrix and a signal reading operation from the accumulator by the horizontal scan device are performed completely independent of one another. The degree of freedom of timing of the read operations is, thus, increased and a high-performance image sensor is provided.

Alternatively, the vertical reading circuit of the sensor of the second embodiment may be a resettable integration circuit which serves as a current-voltage conversion circuit for converting currents in the thermosensing elements of the pixels into corresponding voltage signals.

A third representative embodiment of the thermal infrared image sensor of the present invention includes a plurality of pixels arranged in a matrix having rows and columns, each pixel having thermosensing elements and switches connected thereto. The sensor also includes vertical read lines arranged in columns connected to pixels on respective columns of the matrix. A vertical reading circuit including a current-voltage conversion circuit converts current signals in the thermosensing elements into corresponding voltage signals. An accumulator accumulates, by pixel columns, the signals output from the vertical reading circuit. A transfer switch is arranged between the vertical reading circuit and the accumulator, and a horizontal scan device sequentially and serially outputs the accumulated signals.

Preferably, the vertical reading circuit is (1) a resettable integration circuit, and (2) a second accumulator for accumulating the voltage signals converted by the resettable integration circuit. Thus, while the transfer switch is turned off to cause the horizontal scan device to sequentially and serially read signals from the accumulator, signals from pixels on the next row are accumulated, in parallel, in the second accumulator.

With such a configuration, generation of heat by the thermosensing elements is suppressed, and a thermal sensor possessing a high-sensitivity level and a high-speed reading operation is provided. Additionally, a low-noise signal-reading operation is performed with a simple circuit, the degree of freedom in the timing of the operation of the parts of the sensor is increased, and a high-performance image sensor is provided.

A fourth representative embodiment of the thermal infrared image sensor of the present invention includes a plurality of pixels arranged in a matrix, each pixel having a thermosensing element in which currents flowing therethrough depend upon temperature changes. Each thermosensing element is connected to a switch. Vertical read lines are arranged along pixel columns, to which the thermosensing elements of the pixels on respective columns are connected via the switches. A vertical reading circuit sequentially controls the switches of respective rows of pixels. A current-voltage conversion circuit converts the current signals of the pixels, output in parallel to the vertical read lines by pixel rows, to corresponding voltage signals. An accumulator accumulates the voltage signals output from the current-voltage conversion circuit. A transfer switch, connected between the current-voltage conversion circuit and the accumulator, may be turned on or off. A horizontal read switch sequentially and serially outputs the accumulated pixel columns of signals, and a horizontal scanning circuit sequentially controls the horizontal read switch.

Preferably, the current-voltage conversion circuit is a resettable integration circuit (like that discussed above) and serves as a second accumulator for accumulating the converted voltage signals. While the transfer switch is turned off to cause the horizontal read switch to sequentially and serially output the signals from the accumulator, signal currents of the next row of pixels are converted into voltage signals to be accumulated.

With such a configuration, heat generated by the thermosensing elements is reduced, a low-noise, high-sensitivity signal reading operation is performed, and a sufficiently long period of time is set for signals to be accumulated. Consequently, a high-speed reading operation is easily performed. Additionally, a high-quality signal may be obtained with a simple circuit configuration.

In the thermal infrared image sensor of the present invention, the thermosensing element of each pixel may be a bolometer, a diode, or a circuit obtained by combining a bolometer and a diode. Even if bolometers or diodes are used as the thermosensing elements of the pixels, currents flowing depend on temperature changes and a simple pixel arrangement is obtained. Therefore, the pixels may be arranged in a small area, e.g., on an integrated circuit device. Each pixel may also be a combination of a bolometer and a diode connected in series with one another. In this case, an image sensor having high sensitivity and a wide operation temperature range is provided.

A fifth preferred representative of a thermal infrared image sensor of the present invention includes a plurality of pixels each having a thermosensing element operable to output current signals that are dependent upon changes in temperature. A plurality of read lines are connected to respective columns of pixels. A buffer amplifier is connected along each read line and is operable to output current signals received from scanned pixels. An offset compensator is included that compensates for offsets inherent in the buffer amplifiers. An integration circuit is included to integrate (for a predetermined period of time) output currents received from the buffer amplifiers to output corresponding voltage signals. A serial scanner sequentially and serially reads signals obtained by the integration circuit.

A sixth representative embodiment of the thermal infrared image sensor of the present invention includes a plurality of pixels arranged in a matrix having rows and columns. Each pixel has a thermosensing element operable to output current signals that are dependent upon changes in temperature. Multiple vertical read lines are arranged in columns, wherein each vertical read line is connected to a column of pixels. A buffer amplifier is connected to each vertical read line; the buffer amplifier is operable to output current signals received from scanned pixels. An offset compensator is included that is operable to compensate for offsets inherent in the buffer amplifiers. An integration circuit is included that is operable to integrate (for a predetermined period of time) output currents received from the buffer amplifiers to output corresponding voltage signals. A horizontal scanner sequentially and serially reads signals obtained by the integration circuit.

In the thermal infrared image sensor according to the fifth and sixth representative embodiments, the output currents received from the pixels are read onto the respective read line or the vertical read line. The signals are then integrated, in parallel, by the integration circuit via the buffer amplifiers to output corresponding voltage signals. The voltage signals are then serially read by a serial scanner or the horizontal scanner so that parallel and serial reading operations of the pixels are performed independently. Consequently, the influence of the time constant necessary when using resistance components (i.e., the thermosensing elements) of the pixels and parasitic capacitors connected to the read lines, can be eliminated and the reading speed increased. Therefore, even if the resistance of the thermosensing element (such as a bolometer) is increased to suppress heat generated by the element, a high-speed, high-sensitivity reading operation can be performed. In addition, since a high-speed reading operation can be performed, multiple read circuits are not necessary. Thus, any required peripheral circuit is simplified, and the device can be realized at a relatively low cost.

In addition, the fifth and sixth representative embodiments preferably further include an accumulator for accumulating voltage signals from the integration circuit and a transfer switch connected between the integration circuit and the accumulator. Thus, while the horizontal scanner sequentially reads signals of pixel columns received from the accumulator, signals from the next row of pixels are integrated by the integration circuit.

With the fifth and sixth representative embodiments of the thermal sensor of the present invention, parallel reading operations of rows of pixels and serial reading operations are performed by the horizontal scanner at independent time periods, and the degree of freedom of the timing of reading operations is increased.

The buffer amplifier preferably includes a constant-current transistor. Preferably, the constant-current transistor has a main current path connected between the vertical read line and the input of the corresponding integration circuit. Additionally, the buffer amplifier has an amplifier operable to invert a signal received from the vertical read line and to supply the inverted signal to a control electrode of the constant-current transistor. Such a configuration of the buffer amplifier provides a relatively simple circuit.

The offset compensator can further include a switch for resetting the potential of the vertical read line to a predetermined potential. The switch is turned on when necessary to reset the potential of the vertical read line to a predetermined potential. Thereafter, the switch element is turned off to hold the potential of the vertical read line by the parasitic capacitor of the vertical read line. In this manner, the potential of the vertical read line can be reset at a desired time, while having a simple circuit arrangement.

A seventh representative embodiment of the infrared image sensor of the present invention includes a plurality of pixels arranged in a matrix having rows and columns, each pixel having a thermosensing element operable to output current signals that are dependent upon changes in temperature. The sensor also includes a plurality of vertical read lines each connected to a column of pixels. A vertical reading circuit sequentially selects rows of pixels. A buffer amplifier connected to each vertical read line is operable to output current signals received from scanned pixels. An offset compensator is included that is operable to compensate for offsets inherent in the buffer amplifiers. An integration circuit is included that is operable to integrate (for a predetermined period of time) output currents received from the buffer amplifiers. An accumulator is included that is operable to accumulate voltage signals received from the integration circuit. The sensor also includes a transfer switch connected between the integration circuit and the accumulator, and a horizontal scanner for sequentially and serially reading the accumulated voltage signals.

The seventh representative embodiment of the infrared image sensor described above has the same functional operation as that of the sixth representative embodiment of the sensor.

It is preferable that, in the fifth, sixth, and seventh embodiments of the thermal infrared image sensors described above, each pixel include a bolometer and a switch operable to selectively output, to the vertical signal line, a current signal that is received from the bolometer. When the bolometer and the switch are both used, a current signal that varies dependent upon detected infrared irradiation, can be selectively output to the vertical signal line, and the pixel temperature signals are properly separated with an extremely simple sensor configuration.

In the embodiments discussed above, each pixel may comprise a diode and a switch. The switch is preferably operable to selectively output, to the vertical signal line, a current signal received from the diode. Because a diode may be used as the thermosensing element of each pixel in the present invention, the sensor need not use a special material, such as vanadium oxide, and heat generated by the thermosensing element is decreased.

Additionally, it is preferable that, in the embodiments of the sensors disclosed above, the diode be biased in a forward direction when a current signal is output through the switch. Greater magnitude current signals (thus, voltage signals) may be obtained when the diode is biased in a forward direction than those obtained when the diode is biased in a reverse direction, without increasing the period of time for integration. For this reason, the sensitivity of the infrared image sensor is improved, and the signal-to- noise ratio is increased.

In addition, although the diode may be a diode using an ordinary semiconductor p-n junction, the diode may alternatively be a Schottky barrier diode. A Schottky barrier diode has a diffusion thickness that is smaller than that of a diode using a p-n junction. For this reason, the total thickness of each pixel is reduced, thereby reducing the heat capacity of the pixels. Consequently, the sensitivity of the sensor is improved.

An eighth representative embodiment of the thermal infrared image sensor of the present invention includes a plurality of pixels, each pixel having a thermosensing element operable to output current signals that are dependent upon changes in temperature. A plurality of read lines is connected to a predetermined number of respective pixels. Buffer amplifiers are connected to respective read lines. The buffer amplifiers are operable to output current signals received from scanned pixels. The sensors include current bias devices for biasing the pixels via the buffer amplifiers. A background light-removing device is included for removing current components corresponding to the background light components of the current signals of each of the pixels. An integration circuit integrates (for a period of time) output current signals received from the buffer amplifiers, after the background light components are removed by the background light removing device, to output voltage signals. A serial scanner sequentially and serially reads the signals obtained by the integration circuit.

A ninth representative embodiment of the thermal infrared image sensor of the present invention includes a plurality of pixels arranged in a matrix having rows and columns. Each pixel comprises a thermosensing element operable to output current signals that are dependent upon changes in temperature. A plurality of vertical read lines each connected to a column of pixels. The sensor includes buffer amplifiers, each buffer amplifier being connected to one of the vertical read lines and being operable to output current signals received from scanned pixels. Current-bias devices are provided for biasing the pixels through the buffer amplifiers. A background light-removing device removes current signals of the pixels that correspond to background light. Integration circuits integrate (for a predetermined period of time) current signals output from the buffer amplifiers after the background light components are removed, so as to output corresponding voltage signals. A horizontal scanner sequentially and serially reads the signals obtained by the integration circuit.

In the thermal infrared image sensor according to the eighth and ninth representative embodiments of the present invention, the output currents from the pixels read on their respective read lines or on the vertical read lines. The current signals are then integrated, in parallel, by the integration circuit via the buffer amplifiers to output corresponding voltage signals. The voltage signals are then serially read by the serial scanner or the horizontal scanner, so that the parallel and serial reading operations from the pixels are independently performed. Accordingly, time periods required for the resistance elements of the pixels and the corresponding parasitic capacitors of the read lines can be eliminated and reading speed increased. Therefore, even if the resistance of a thermosensing element, such as a bolometer, is increased to suppress heat generation by the elements, a high-speed, high-sensitivity reading operation can be performed. In addition, since a high-speed reading operation can be performed, a plurality of read circuits are not necessary and the peripheral circuit is simplified, producing a simple and low-cost sensor.

Since only the currents of the signal components (not the background light components of the current signals) are integrated, the gain of the integration circuit can be increased regardless of the background light components, and a high-sensitivity reading operation can be performed with a high signal/noise ratio.

In thermal infrared image sensors according to the eighth and ninth representative embodiments of the present invention, it is preferable to have at least one row of the pixels constitute "dummy" pixel row(s). The "dummy" pixel rows are shielded from infrared irradiation and can be independently scanned. The current bias device causes a predetermined bias current to flow in a selected dummy pixel row, thereby setting voltages of the vertical read lines in such a manner that currents corresponding to the background light components are equal to the predetermined bias current. Therefore, the pixels can be biased with a constant current in advance such that the current outputs are constant. For this reason, the background light components of the pixels do not vary, and any fixed-pattern noise is canceled.

A current bias device preferably includes a first current source connected through a switch to the output of the buffer amplifier. The background-light-removing device includes a second current source connected to the output of the buffer amplifier through another element operated with the switch of the current bias device. Current values of the first current source and the second current source are correlated to one another.

Preferably, the current value of the first current source and the current value of the second current source are of equal value, or the current value of the first current source is always larger than the current value of the second current source. Accordingly, the current values of the first current source and the second current source are "correlated." Accordingly, the fixed-pattern noise and the background light components can be removed, so that a reading operation having a low noise level and high sensitivity is performed.

The current-bias device also functions as the background-light-removing device. Additionally, the current-bias device has a switch operable to disconnect the current source from the output of the buffer amplifier and the input of the integration circuit.

In addition, the thermal infrared image sensor of the present invention preferably further includes an accumulator for accumulating the voltage signals received from the integration circuit and a transfer switch connected between the integration circuit and the accumulator. Accordingly, while the horizontal scanner sequentially reads signals from the accumulator by pixel columns, signals read from the next row of pixels are integrated by the integration circuit.

With the above arrangement, a parallel reading operation from the pixels on the respective rows and a serial reading operation by the horizontal scanner are performed completely independently of one another.

The buffer amplifier preferably includes a constant-current transistor having a main current path connected to the vertical read line, and an amplifier for inverting a signal received from the vertical read line to supply the inverted signal to a control electrode of the constant-current transistor. Accordingly, a current buffer operation can be performed with a relatively simple circuit.

A tenth representative embodiment of the thermal infrared image sensor of the present invention includes a plurality of pixels arranged in a matrix having rows and columns, each pixel having a thermosensing element operable to output current signals that vary depending on changes in temperature caused by infrared irradiation. Each pixel also comprises a respective switch to selectively output the current signals from the thermosensing element. A plurality of vertical read lines is included, each vertical read line being connected to a column of pixels. A vertical reading circuit sequentially selects rows of pixels. Buffer amplifiers are connected to representative vertical read lines. The amplifiers output current signals received from selected pixels. A current-bias device biases the pixels via the buffer amplifiers. A background-light-removing device removes current components corresponding to the background light components of the current signals of each of the pixels. An integration circuit integrates (for a predetermined period of time) output currents received from the buffer amplifiers, after the current signals due to background light are removed, to output voltage signals. Accumulators accumulate the voltage signals from the integration circuit. Transfer switches are arranged between the integration circuit and the accumulator, and a horizontal scanner sequentially and serially reads the accumulated voltage signals.

The tenth representative embodiment of the thermal infrared image sensor described above operates in the same manner as the ninth representative embodiment. Accordingly, a high-speed and high-sensitivity reading operation is performed with a relatively simple device.

Additionally, as described above, it is preferable that at least one row of the pixels be a "dummy" pixel row that is shielded from infrared irradiation. The current-bias device can cause a predetermined bias current to flow through the dummy rows of pixels such that the current signals due to the background light do not vary and fixed-pattern noise is canceled.

EXAMPLES

A first representative embodiment of the thermal infrared image sensor of the present invention is illustrated in FIG. 1. In the thermal infrared image sensor shown in FIG. 1, for convenience, nine pixels are arranged in a matrix having three rows and three columns of pixels. Each pixel includes a thermosensing element Rij and a vertical switch Qij. Each thermosensing element Rij may be, for example, a bolometer, exhibiting a resistance that changes with changes in temperature resulting from infrared irradiation. The vertical switch Qij may be, for example, a MOS transistor. When the vertical switch Qij is turned on, a current signal is read from the vertical switch Qij.

A power supply voltage VRB is applied to one end of each of the thermosensing elements Rij, and the other ends of the thermosensing elements Rij are connected to drains of the corresponding vertical switches Qij. The sources of the switches Qij are connected to vertical read lines LVj (j=1–3) along the columns of pixels in the matrix.

Gates of the vertical switches Qij are connected to respective clock lines CLi (i=1–3) along rows of pixels in the matrix. The clock lines CLi are connected to a vertical reading circuit VSR. Therefore, drive pulses sent from the vertical reading circuit VSR to the clock lines CLi sequentially operate the vertical switches Qij in rows.

The vertical read lines LVj are connected to inputs of integration circuits INTj along each pixel column. Parasitic capacitors CVj are connected between the vertical read lines LVj and a ground. A reset pulse $\phi$RT (described below) may be supplied to the integration circuits INTj.

The output of each integration circuit INTj is connected to the source of the corresponding transfer switch QTj. The transfer switches QTj, arranged by pixel columns, may comprise MOS transistors. The gates of the transfer switches QTj may be connected to receive a transfer control pulse $\phi$T (discussed below). The drains of the transfer switches QTj are connected to the sources of horizontal switches QHj that are preferably MOS transistors. Accumulation capacitors CTj are, preferably, connected between the transfer switches QTj and the horizontal switches QHj, and each has one terminal connected to ground.

The drains of the horizontal switches QHj are preferably connected to a horizontal read line LH that is connected to an output terminal VOUT. The gates of the horizontal switches QHj are connected to respective horizontal selection signal lines HSj connected to a horizontal scanning circuit HSR. A drive pulse sent from the horizontal scanning circuit HSR controls a horizontal read operation.

A reset switch QRH may comprise, for example, a MOS transistor. A drain of the reset switch QRH is connected to the horizontal read line LH. The source of the reset switch QRH is grounded. A drive pulse $\phi$RH is supplied to the gate of the reset switch QRH to turn on the reset switch each time the horizontal read operation is ended, so as to reset the potential of the horizontal read line LH. A parasitic capacitor CH is preferably placed along the horizontal read line LH. In FIG. 1, the capacitor CH, connected between the horizontal read line LH and the ground, represents the above-described parasitic capacitor.

Figure 2:
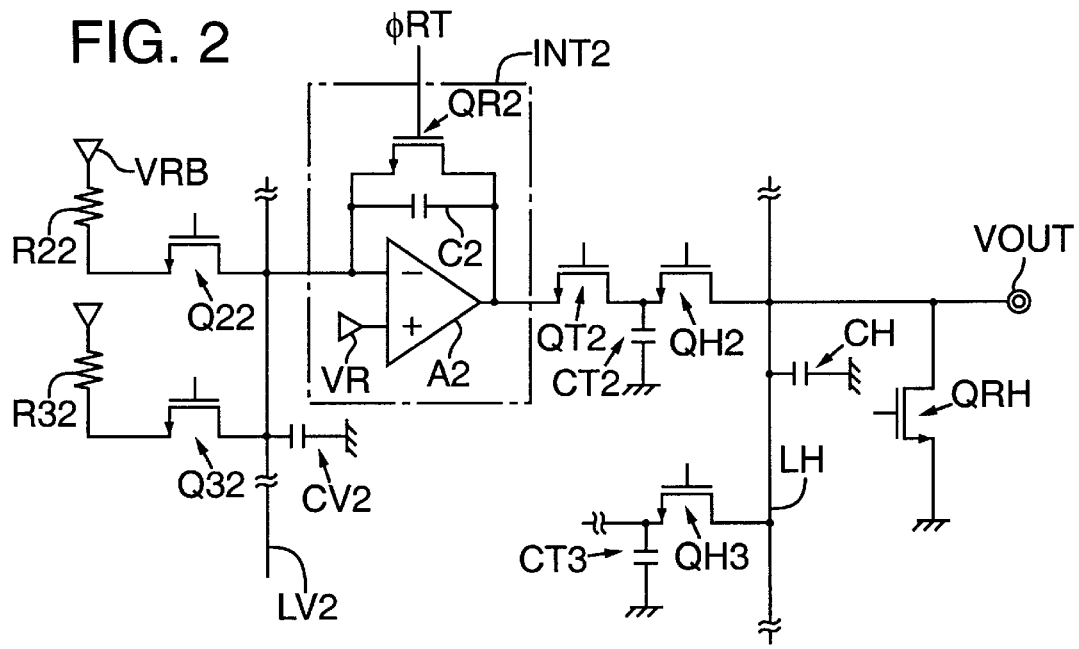
FIG. 2 is an electric circuit diagram showing a preferred embodiment of an integration circuit of the thermal infrared image sensor shown in FIG. 1.

FIG. 2 shows a detailed arrangement of an integration circuit INTj of the thermal infrared image sensor of FIG. 1, together with a peripheral circuit of the integration circuit.

For convenience, the reference numerals used in FIG. 1 are used to denote the same features in FIG. 2. FIG. 2 illustrates an example of an integration circuit INT2 connected to a vertical read line LV2 of the second pixel column, and a peripheral circuit of the integration circuit INT2.

The integration circuit INT2 includes an amplifier A2, a capacitor C2, and a reset transistor QR2. An inverter input terminal of the amplifier A2 is connected to the vertical read line LV2. A predetermined bias voltage VR is applied to a non-inverter input terminal of the amplifier A2. The capacitor C2 is placed along a negative feedback path of the amplifier A2 (i.e., the capacitor C2 is connected between the output terminal and the inverted input terminal of the amplifier A2). The main current path of the reset transistor QR2 is connected in parallel to the capacitor C2. More specifically, the drain of the reset transistor QR2 is connected to the output terminal of the amplifier A2, and the source is connected to the inverted input terminal. The gate of the reset transistor QR2 may receive the reset pulse $\phi$RT (described above). Each of the integration circuits INT1 and INT3, connected to the respective vertical read lines LV1 and LV3, has the same arrangement as described for INT1.

In the integration circuit INT2 shown in FIG. 2, when the reset transistor QR2 is off, charge depending on a current flowing in the inverted input terminal is accumulated in the capacitor C2, and a voltage depending on the accumulated charge may be extracted from the output terminal of the amplifier A2. When the reset transistor QR2 is turned on, the charge accumulated in the capacitor C2 may be discharged to reset the integration circuit.

During operation of the thermal infrared image sensor illustrated in FIGS. 1 and 2, it is assumed that signals of the first row of pixels are accumulated in the accumulation capacitors CTj (j=1–3) by a method described below. The horizontal switches QHj are sequentially turned on by a drive pulse supplied from the horizontal scanning circuit HSR via horizontal selection signal lines HSj. The signals of the first row of pixels are sequentially output to the horizontal read line LH to terminal VOUT.

In the horizontal read operation, after a signal from one of the horizontal switches QHj is output to the horizontal read line LH, the reset switch QRH is turned on by the drive pulse $\phi$RH to reset any residual charge of the horizontal read line. Thereafter, the horizontal switch QHj of the next pixel column is turned on. In this manner, after any residual charge generated by the signals accumulated in the capacitor CH of the pixels on the previous column is discharged, signals of the next column of pixels may be read. Therefore, the signal/noise ratio is increased, and a read operation is properly performed.

During the above horizontal read operation, the vertical reading circuit VSR adds a drive pulse to the clock line CL2 to select the second row of pixels, thereby turning on vertical switches Q2j. The reset pulse $\phi$RT supplied to the integration circuits INTj is set to a low level, and the reset switches QRj of the integration circuits are off (FIG. 2). Charge generated by a current flowing in the thermosensing elements R2j of the second row of pixels is accumulated in the capacitors Cj of the integration circuits INTj (FIGS. 1 and 2). At this time, the transfer switches QTj of the respective columns are off (FIG. 1).

As described above, signals of the second row of pixels are accumulated in the capacitors Cj (i.e., "second accumulators") of the integration circuits INTj. At the end of the horizontal read period (i.e., at the end of the read operation of the accumulation capacitor CT3) the transfer switches QTj of the respective pixel columns are turned on by the transfer control pulse φT. Output voltages of the integration circuits INTj accumulated in the second capacitors Cj (the signals of the second row of pixels) are charged in the capacitors CTj serving as the first accumulators via the transfer switches QTj.

After the charging of the capacitors CTj, transfer switches QTj are turned off to separate the integration circuits INTj from the capacitors CTj. The reset switches QRj (FIG. 2) of the integration circuits INTj are then turned on by the reset pulse φRT to discharge any charge accumulated in the capacitors Cj (the second accumulators). These operations are performed during a horizontal retrace-line period.

After the information of the second row of pixels is charged in the capacitors CTj, the horizontal read switch QH1 is turned on as described above. This causes the charge in capacitor CT1 to be distributed to the capacitor CH of the horizontal read line LH, and causes the signals on the first pixel column to be read and supplied via output terminal VOUT to a device outside the sensor. The reset switch QRH is turned on by the drive pulse φRH and the charge in the capacitor CH and the horizontal read switch QH2 is turned on to read the signals of the second column of pixels. Similarly, signals of the pixels of the third column are read. In this horizontal read operation, the same scheme as the reading scheme of a conventional visible image sensor is used, and the operation may be performed at a speed almost equal to that of the NTSC scheme or the like.

During the horizontal read operation for the second row of pixels, the vertical switch Q3j of the third row of pixels is turned on by the vertical reading circuit VSR. The integration reset switches QRj of the integration circuits INTj are turned on by the reset pulse ART. Additionally, the transfer switches QTj of the respective pixel columns are turned off by the transfer control pulse φT. In the same manner as that described with respect to the second row of pixels, the signals of the third row of pixels are charged to capacitors Cj of the integration circuits INTj. During a horizontal read operation for the last row (the third row), signals of the first row of pixels are simultaneously read and charged in the second accumulators (capacitors Cj) and the signals are then accumulated in the capacitors CTj. Thereafter, the horizontal read operation for the first row is again performed.

In this manner, the vertical read operation for the pixels and the horizontal read operation for the pixels are independently performed, and a sufficient period of time is allowed for the vertical read operation. Accordingly, even if the resistance values of the bolometers of the pixels are increased, the horizontal read operation is not adversely affected and a high-speed reading operation is performed.

Figure 5:
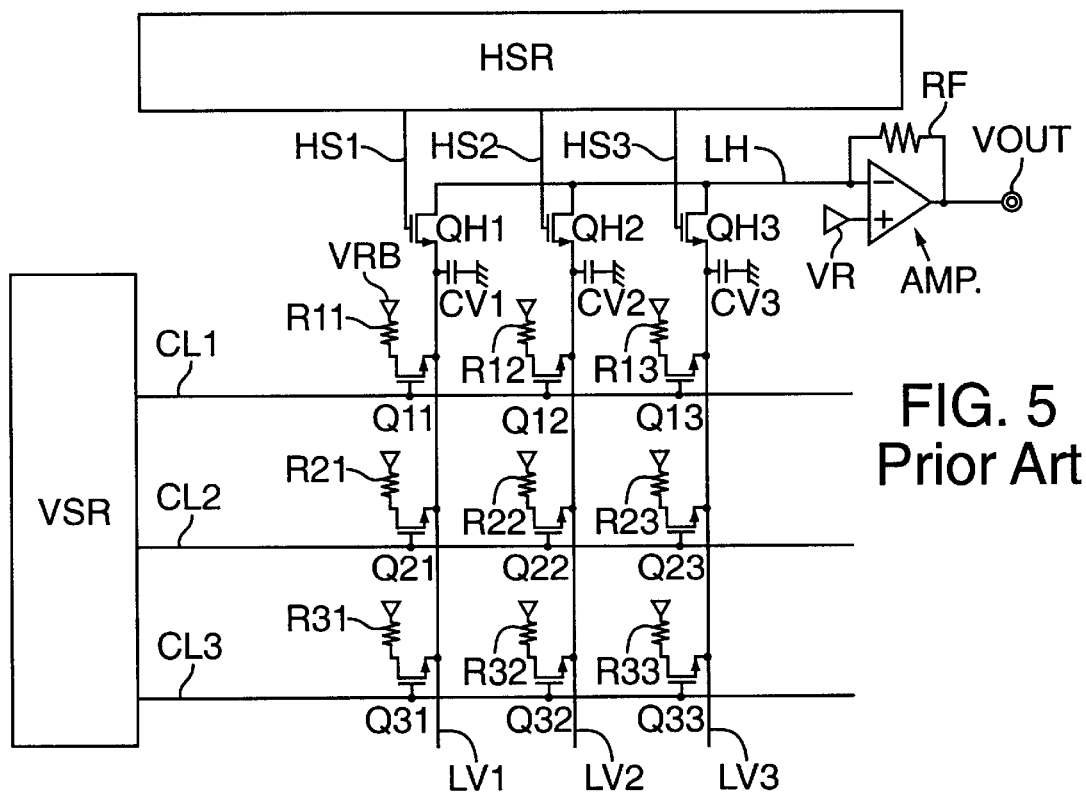
FIG. 5 is a schematic block circuit diagram showing a prior art thermal infrared image sensor.
Figure 6:
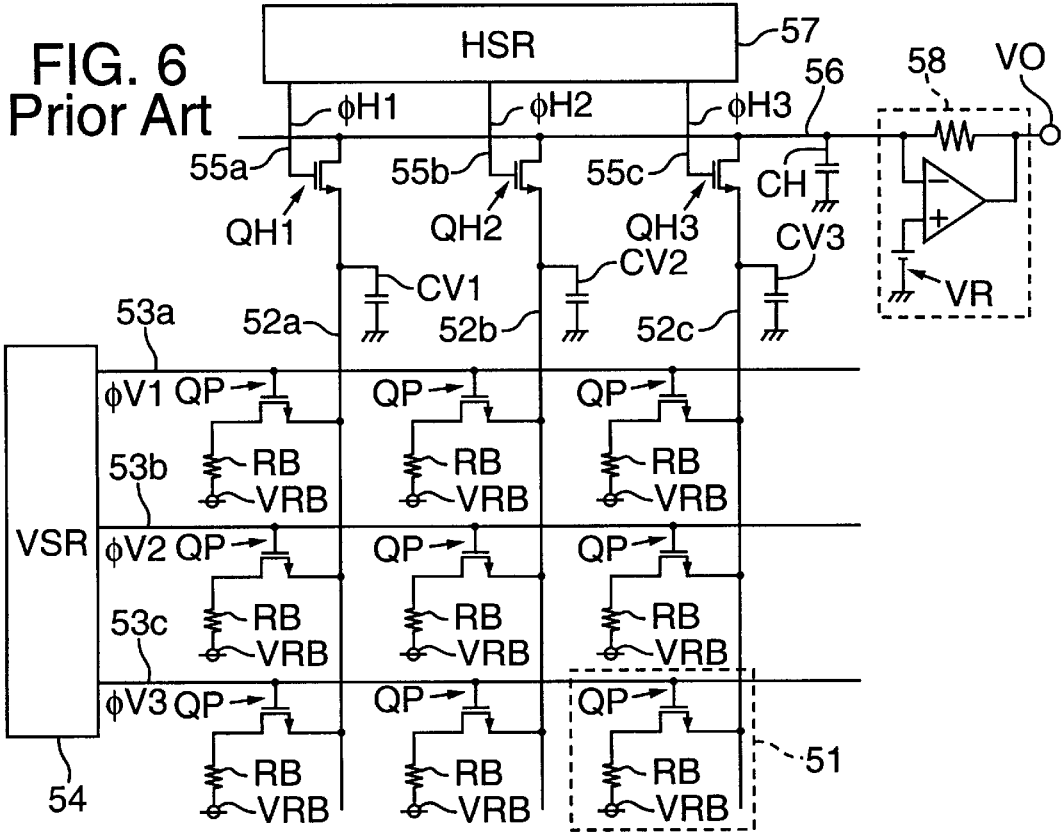
FIG. 6 is a schematic block circuit diagram showing a prior art thermal infrared image sensor.
Figure 7:
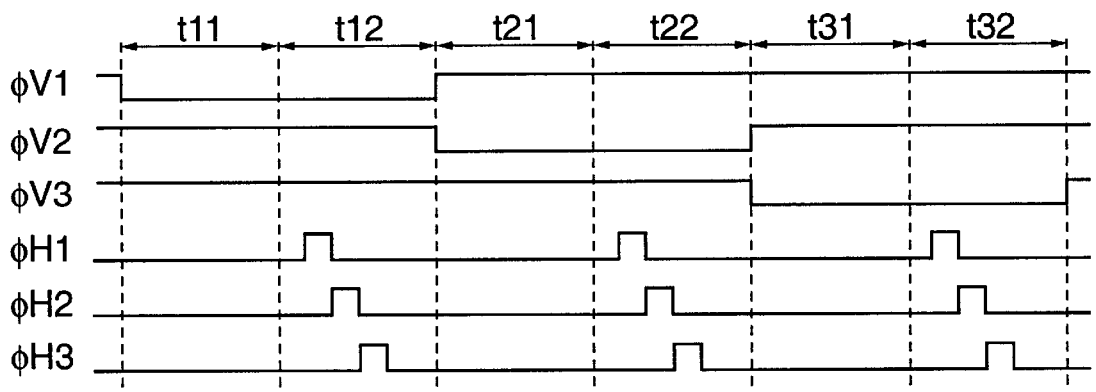
FIG. 7 is a pulse timing chart for the prior art thermal infrared image sensor shown in FIG. 6.

In FIG. 1, the pixels are arranged in a 3×3 matrix for descriptive convenience. Actually, a pixel arrangement of a matrix comprising several hundred or more rows and columns is typical. Conventionally, the horizontal sync signal frequency of a NTSC scheme is 15.75 kHz, and the horizontal read period is about 50 µs. In this time period, a vertical read operation for the pixels may be performed. Therefore, the switching cycle of the pixels in the present invention sensors is several hundred times the several MHz of the prior art described above and illustrated in FIG. 5. More specifically, even if high-resistance bolometers are used in the sensor of the present invention, a satisfactory response is obtained.

In the thermal infrared image sensor shown in FIGS. 1 and 2, although bolometers are preferably used as the thermosensing elements, the thermosensing elements alternatively can be p-n junction diodes or surface barrier transistors (SBT). A forward-direction current of a p-n junction diode or a SBT, biased by a constant voltage (or a dark current of a p-n junction diode or the SBT which is inversely biased), changes by about one digit with a temperature change of about 30 K. Consequently, such diodes and the SBTs are high-sensitivity thermosensing elements.

Figure 3:
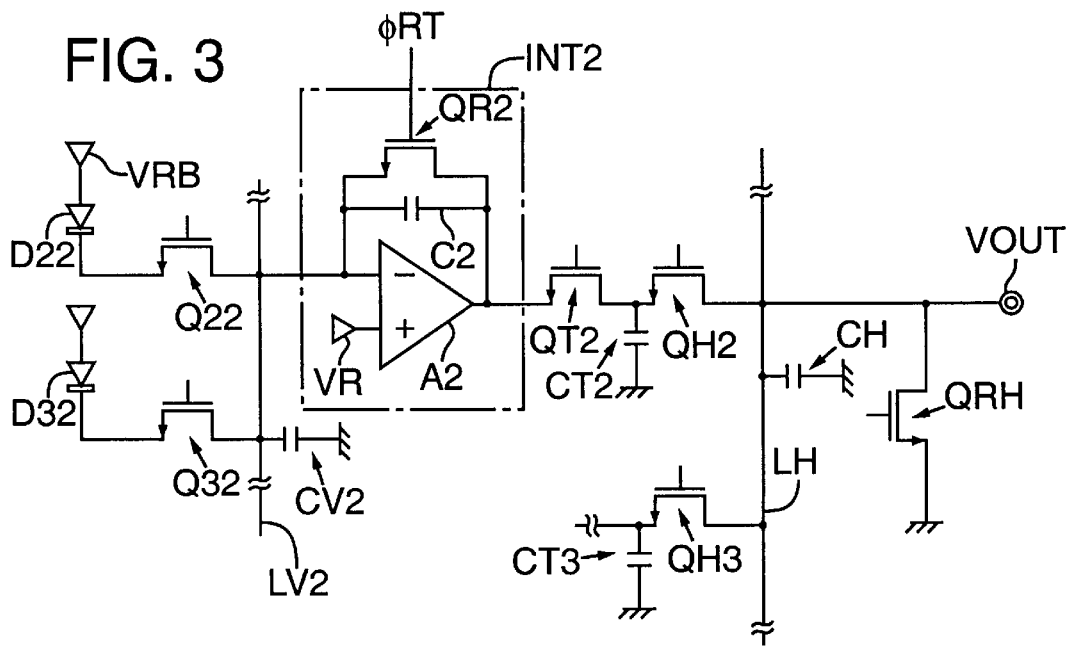
FIG. 3 is a partial electric circuit diagram of a second representative embodiment of a thermal infrared image sensor of the present invention.
Figure 4:
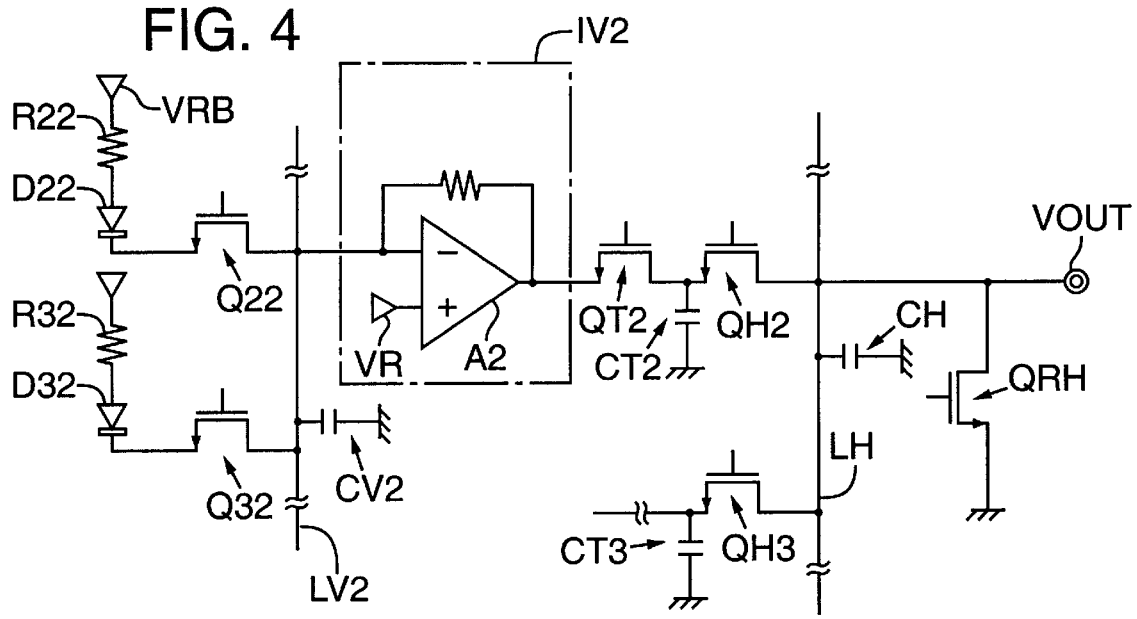
FIG. 4 is a partial electric circuit diagram of a third representative embodiment of a thermal infrared image sensor of the present invention.

The embodiment illustrated in FIG. 3 utilizes such diodes as thermosensing elements. I.e., the bolometers R22, R32, etc., of the pixels in the circuit shown in FIG. 2 are replaced with diodes D22, D32, etc., in FIG. 3. As shown in FIG. 4, the pixel section may also use thermosensing elements comprising a combination of a bolometer and a p-n junction diode or an SBT. In the embodiment shown in FIG. 4, the bolometers R22, R32, etc., in FIG. 2 are replaced with a serial circuit comprising a bolometer R22 and a diode D22, or the like.

The diode of each pixel shown in FIGS. 3 and 4 is used in a forward bias direction. However, as described above, the diode can also be used in a reverse bias direction so that a change in temperature of a dark current in the reverse-bias state may be used as a signal.

In the embodiments of the sensor shown in FIGS. 1–3, the integration circuits INTj are used as vertical read means. This is because, in general, in a semiconductor process (especially a process using MOS transistors that can easily constitute vertical and horizontal scanning circuits), a capacitor may be easily manufactured when compared with the manufacturing process of a resistor. However, when a high-resistance process is acceptable, a resistor may be used in the integration circuit rather than using an accumulation capacitor, as shown in FIG. 4.

When a current-voltage conversion circuit IVj is utilized (FIG. 4), signals of a row of pixels are simultaneously read and transferred to the capacitor CTj serving as the first accumulator via the current-voltage conversion circuit IVj. Thereafter, a horizontal read operation may be performed from the capacitor CTj. Therefore, a response speed of only 20 kHz is required for this embodiment of the sensor of the present invention, where a response speed of several MHz is required in the prior art discussed above. As a result, a bolometer having a high resistance value (i.e., a resistance value that is several hundred times that of the prior-art thermosensing elements) may be used, and the detrimental effect of heat generated from the bolometers in the sensor is considerably decreased.

As described above, an integration circuit or a current-voltage conversion circuit may be used as a vertical read means, and a diode or a bolometer may be used as a thermosensing element in a pixel section. In this case, a circuit used as a vertical reading circuit and the arrangement of thermosensing elements in the pixel section may be arbitrarily combined.

Embodiments of an image sensor having pixels arranged in two-dimensional matrices have been described above. However, the present invention may also be applied to a line sensor wherein pixels are arranged in a one-dimensional matrix. In addition, the present invention may also be applied to a temperature-distribution measurement device having pixels arranged at a plurality of points wherein the temperature distributions at the plurality of points are measured by the sensor.

As has been described above, after signals of each row of pixels are simultaneously read and temporarily accumulated in the corresponding accumulator, the signals are then read sequentially from the accumulators. In this manner, reading operations from the pixels, i.e., vertical read operations and horizontal read operations, may be independently performed. Therefore, the influence of the time constant between the resistance components of the pixels and the parasitic capacitors of the read lines may be eliminated, and a high-speed reading operation may be performed while heat generated by the thermosensing elements is suppressed.

Figure 8:
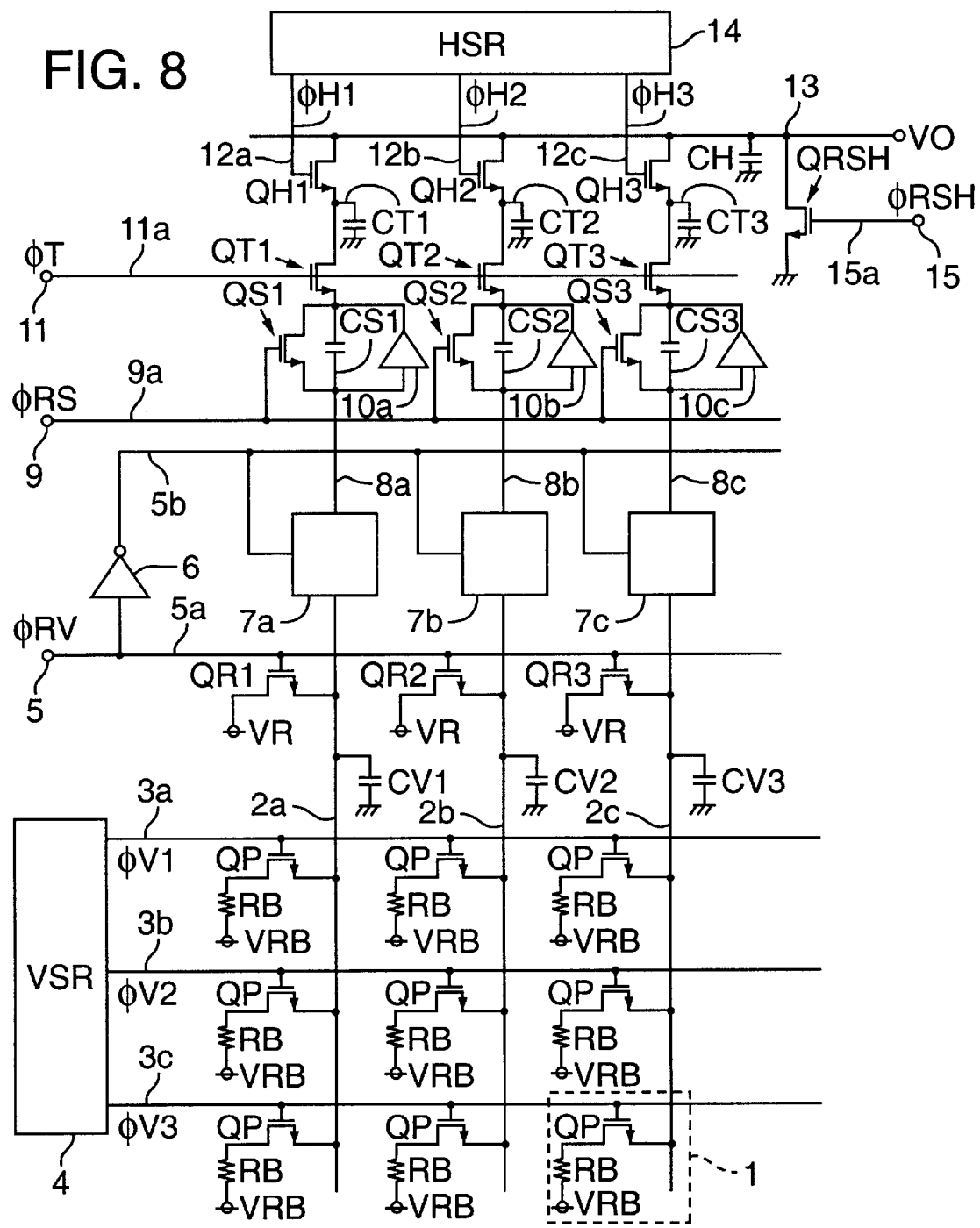
FIG. 8 is a schematic block circuit diagram of a fourth representative embodiment of a thermal infrared image sensor of the present invention.

FIG. 8 illustrates a thermal infrared image sensor according to a fifth representative embodiment. In the thermal infrared image sensor shown in FIG. 8, for descriptive convenience, nine pixels 1 are arranged in a 3×3 matrix. Each pixel 1 includes a bolometer RB serving as a thermosensing element, and a switch QP, such as a p-channel MOS transistor, to selectively output a current signal flowing from each bolometer RB to each corresponding vertical signal line 2a–2c.

With respect to each pixel, a power supply voltage VRB is applied to one of the terminals of the bolometer RB. The drain of the switch QP is connected to the other terminal of the bolometer RB. The source of switch QP is connected to the corresponding vertical read line 2a–2c. When the switch QP is turned on, the current signal is read from the bolometer RB.

The gate of switch QP is connected to the corresponding clock line 3a–3c. The clock lines 3a–3c connect a vertical reading circuit 4 to rows of pixels in the matrix. When drive pulses $\phi V1$–$\phi V3$ are sent from the vertical reading circuit 4 to the switches QP, rows of the switches QP are sequentially operated.

The vertical read lines 2a–2c connect the drains of reset switches QR1–QR3 to the corresponding inputs of amplifiers 7a–7c. The reset switches QR1–QR3 are, preferably, are n-channel MOS transistors. The sources of the reset switches QR1–QR3 are connected to a power supply VR. The gates of the reset switches QR1–QR3 are connected to a drive pulse generation circuit (not shown) via a clock line 5a and a terminal 5. When a drive pulse $\phi RV$ is sent from the clock pulse generation circuit to the gates of the reset switches QR1–QR3, the reset switches QR1–QR3 are turned on. When the reset switches are turned on the inputs of the vertical read lines 2a–2c and the amplifiers 7a–7c are reset to the power supply voltage VR. Thus, operation of an offset compensator is performed.

Parasitic capacitors CV1–CV3 are preferably located along the vertical read lines 2a–2c between the columns of pixels and the reset switches QR1–QR3. The amplifiers 7a–7c are connected to the output terminal of an inverter 6 through a clock line 5b. The input terminal of the inverter 6 receives the drive pulse $\phi RV$ sent from the drive pulse generation circuit (not shown) through the clock line 5a. When a drive pulse $\phi RV$ is obtained and inverted by the inverter 6 and is output from the inverter 6 terminal, as described below, biasing for the amplifiers 7a–7c is controlled.

Output lines 8a–8c of the amplifiers 7a–7c are connected to the respective integration circuits that are comprised of integration amplifiers 10a–101, integration capacitors CS1–CS3, and capacitor reset switches QS1–QS3. I.e., the input terminal of each integration amplifier 10a–10c is connected to one terminal of the respective integration capacitor CS1–CS3, and to the source of the respective capacitor reset switch QS1–QS3. The capacitor reset switches are, preferably, n-channel MOS transistors. The gates of the capacitor reset switches QS1–QS3 are connected to a drive-pulse-generation circuit (not shown) through a clock line 9a and a terminal 9. A drive pulse $\phi RS$ is sent from the drive-pulse-generation circuit to the gates of the capacitor reset switches to turn the reset switches on.

The integration amplifiers 10a–10c, the integration capacitors CS1–CS3, and the reset switches QS1–QS3 are arranged along pixel columns, so that output current signals from the buffer amplifiers may be integrated for a predetermined period of time. The output terminal of each integration amplifier 10a–10c, the other terminal of each respective integration capacitor CS1–CS3, and the drain of each respective capacitor reset switch are connected to the output terminal of the respective integration circuit.

The outputs of the integration circuits are connected via transfer switches QT1–QT3 to the respective accumulation capacitors CT1–CT3, each capacitor having one grounded terminal. The integration circuits are then connected to a horizontal read line 13 through respective horizontal switches QH1–QH3. In this manner, voltage signals accumulated in the accumulation capacitors CT1–CT3 are sequentially output from an output terminal VO through the respective horizontal switches QH1–QH3.

The gates of the switches QT1–QT3 are connected to a drive-pulse-generation circuit (not shown) through a clock line 11a and a terminal 11. When a drive pulse $\phi T$ is sent from the drive-pulse-generation circuit to the gates of a switch QT1–QT3, the switch is turned on.

The gates of the horizontal switches QH1–QH3 are connected to horizontal selection signal lines 12a–12c, respectively, which are connected to a horizontal scanning circuit 14. A horizontal read operation is controlled by drive pulses $\phi H1$–$\phi H3$ sent from the horizontal scanning circuit 14 through the horizontal selection signal lines 12a–12c.

In addition, the drain of a reset switch QRSH is connected to the horizontal read line 13, while the source of the reset switch is grounded. The gate of the reset switch QRSH is connected to a drive-pulse-generation circuit (not shown) through a horizontal selection signal line 15a and a terminal 15. A drive pulse $\phi RSH$ is sent from the drive-pulse-generation circuit to the gate of the reset switch QRSH to turn the reset switch on.

A parasitic capacitor CH is preferably connected along horizontal read line 13.

Figure 9:
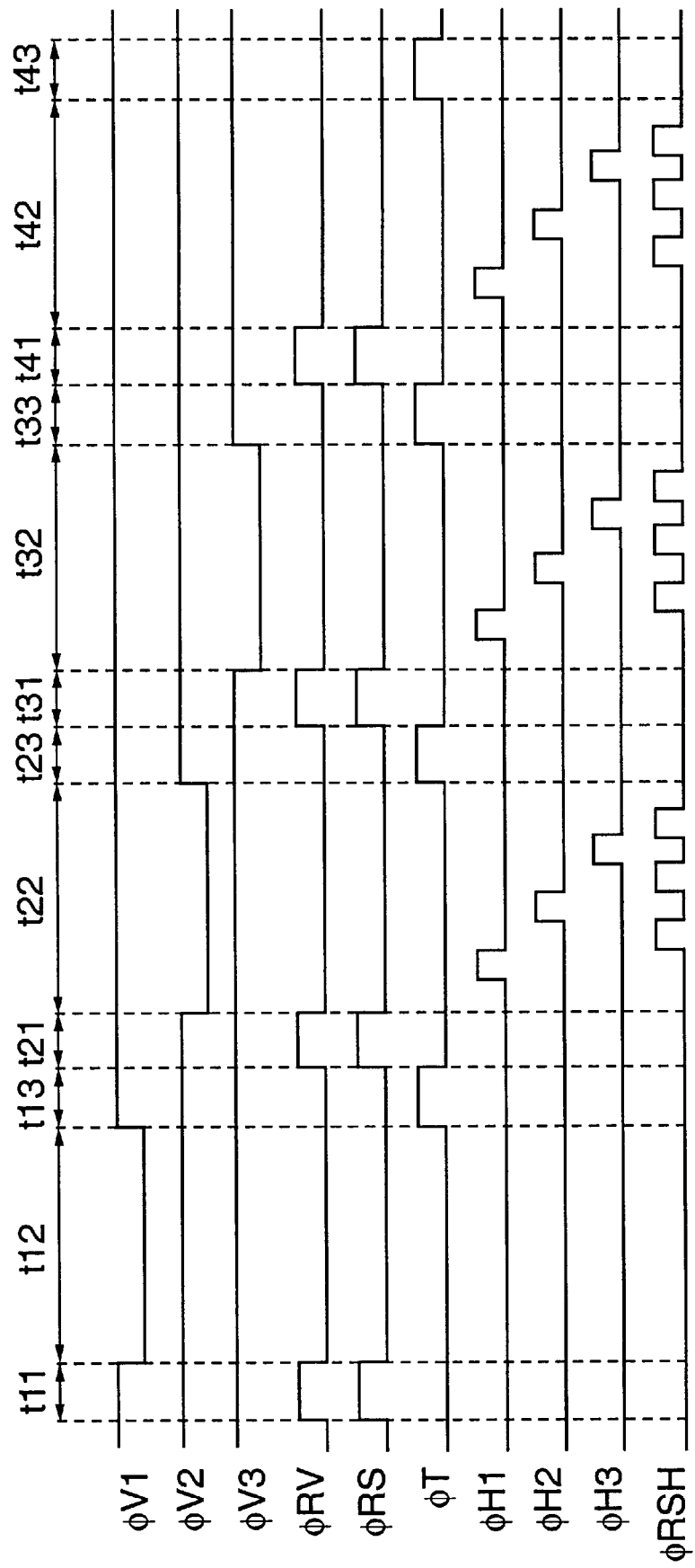
FIG. 9 is a pulse timing chart for the thermal infrared image sensor shown in FIG. 8.

Operation of the thermal infrared image sensor shown in FIG. 8 is described with reference to a pulse timing chart shown in FIG. 9. Referring to FIG. 9, periods t11 to t13 indicate vertical-read periods for the first row of pixels 1, periods t21 to t23 indicate horizontal-read periods for the first row of pixels and vertical-read periods for the second row of pixels, and periods t31 to t33 indicate horizontal-read periods for the second row of pixels and vertical-read periods for the third row of pixels. Pixels t41 to t43 also indicate horizontal-read periods for the third row of pixels.

As shown in FIG. 9, since the drive pulses $\phi V1$–$\phi V3$ are at a high level during period t11, the switches QP of the pixels 1 are in an OFF state. When the drive pulse $\phi RV$ is at a low level, the switches QR1–QR3 are in an ON state, and the potentials of the vertical read lines 2a–2c are biased to VR. Since the drive pulse $\phi RV$ is at high level, the clock line 5b goes to low level, and the amplifiers 7a–7c are set in a bias setting state.

As shown in FIG. 9, when the drive pulse $\phi RS$ is at a high level during period t11, the capacitor reset switches QS1–QS3 are in an ON state, and charges in the integration capacitors CS1–CS3 are reset. In addition, when the drive pulse $\phi T$ is at low level, the transfer switches QT1–QT3 are in an OFF state.

When the drive pulse $\phi RV$ is at a low level during period t12, the reset switches QR1–QR3 are turned off, and the vertical read lines 2a–2c are set in a "floating" state. However, due to the effect of the parasitic capacitors CV1–CV3, the potentials of the vertical read lines 2a–2c are kept biased to VR. When the drive pulse φRV is set at a low level, the clock line 5b goes to a high level, and the amplifiers 7a–7c are set in a bias-holding state to be operated as current buffer amplifiers to output currents equal to an input current.

Buffer amplifiers of this type generally have inherent, varying offsets. In the present invention, the potential of the vertical read line serving as the input of the buffer amplifier is reset to VR during period t11, and the potential is held. For this reason, variations of the offsets of the buffer amplifiers are canceled. The potential of the vertical read line can also be independently determined regardless of the influence of following circuits, such as the integration circuits. The preferred configuration and operation of the amplifiers 7a–7c are described below.

When the drive pulse φV1 is set to a low level during period t12, the switches QP are turned on, and current signals of the first row of pixels 1 are output to the vertical read lines 2a–2c. The current signals of the pixels 1 are input to the amplifiers 7a–7c, respectively, and the buffer amplifiers operate as current buffer amplifiers. For this reason, the current signals are output to the output lines 8a–8c. Each of the current signals IRB may be expressed by Equation (2) as follows:

$$IRB=(VR-VRB)/RB \qquad (2)$$

where RB is the resistance value of the bolometer RB. In Equation 2, the resistance value RB of the bolometer changes depending on changes in temperature caused by infrared irradiation. As a result, the current signal IRB corresponding to the change in temperature is output from each pixel 1.

As expressed by Equation 2, when the potentials VR of the vertical read lines vary, the current signals IRB may vary to cause generation of a "fixed-pattern" noise. However, since the current signals are output after the potentials of the vertical read lines are equally reset to VR regardless of the influence of circuits that follow, the current signals IRB do not vary and a fixed-pattern noise is not generated.

When the drive pulse φRS is set at a low level during period t12, the capacitor reset switches QS1–QS3 are turned off, and the current signals IRB output to the output lines 8a–8c are integrated for period t12 by the integration capacitors CS1–CS3. As a result, output voltages (voltage signals) are set to a voltage VSO, which may be expressed by Equation (3) as follows:

$$VSO=(IRB \times t12/CS)+VSR \qquad (3)$$

where CS represents the capacitance values of integration capacitors CS1–CS3, and VSR is the initial voltage of the integration circuit.

At the end of period t12, the drive pulse φV1 is set at a high level, the switches QP of the first row of pixels 1 are turned off, and the integration operation is stopped.

When the drive pulse φT is set at a high level during period t13, the transfer switch QT1–QT3 are turned on and the output voltage signals from the integration circuits are accumulated in the accumulation capacitors CT1–CT3, respectively.

At the end of period t13, the drive pulse φT is set at a low level, the switch transistors QT1–QT3 are turned off, and the voltage signals are held in the accumulation capacitors CT1–CT3, respectively. In this manner, the vertical reading operation for the first row of pixels 1 is completed.

The vertical read operation for the first row of pixels 1 with respect to periods t11 to t13 is similarly performed for the second row of pixels during periods t21 to t23. However, the vertical reading operation of the second row of pixels and a horizontal reading operation for the first row of pixels 1 are simultaneously performed during period t22. More specifically, the drive pulse φT is set at a low level during periods t21 and t22, and the switches QT1–QT3 are turned off. For this reason, a horizontal reading operation of the voltage signals, which are held in the accumulation capacitors CT1–CT3, of the first row of pixels 1 and a vertical reading operation of the second row of pixels are independently but simultaneously performed.

The horizontal reading operation for the first row of pixels 1 during period t22 is described below.

High-level drive pulses φH1–φH3 are sent from the horizontal scanning circuit 14 during period t22, and the horizontal switches QH1–QH3 are sequentially turned on. For this reason, the voltage signals, which are held in the accumulation capacitors CT1–CT3 of the first row of pixels 1, are sequentially output to the output terminal VO through the horizontal read line 13.

When the parasitic capacitor CH is connected along the horizontal read line 13, and the voltage signals are read onto the horizontal read line, some of the voltage signals are held in the parasitic capacitor CH to remain on the horizontal read line. For this reason, the drive pulses φH1–φH3 sent from the horizontal scanning circuit 14 are sequentially applied at a high level. Each time the voltage signals accumulated in the accumulation capacitors CT1–CT3 are output to the output terminal VO, the drive pulse φRSH turns on the reset switch QRSH, thereby resetting (initializing) the horizontal read line 13.

The horizontal reading operation for the first row of pixels 1 and the vertical reading operation for the second row of pixels during time periods t21–t23 are similarly performed during periods t31 to t33 for a horizontal reading operation of the second row of pixels 1 and a vertical reading operation for the third row of pixels. In addition, a horizontal reading operation for the third row of pixels is similarly performed during periods t41 to t43, and the reading operations for all the pixels are then completed.

As described above, the vertical and horizontal reading operations for the pixels 1 are independently performed. For this reason, when the resistances of the bolometers of the pixels 1 are increased, the reading operations are still performed at high speed. Since a plurality of horizontal read lines are not necessary, the circuit configuration is relatively simple and a low-cost sensor is provided.

Figure 10:
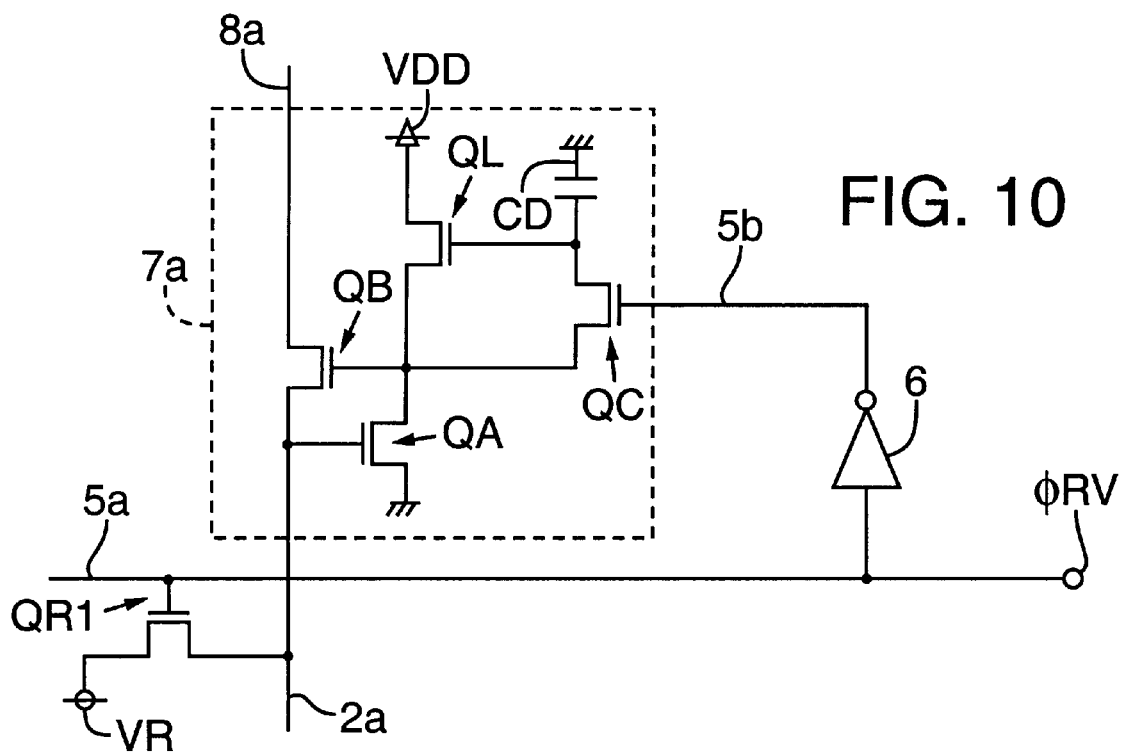
FIG. 10 is a schematic circuit diagram of a preferred embodiment of a buffer amplifier used in the thermal infrared image sensor shown in FIG. 8.

FIG. 10 illustrates a preferred embodiment of the buffer amplifiers 7a–7c shown in FIG. 8. For descriptive convenience, only one of the three buffer amplifiers shown in FIG. 8 is illustrated in FIG. 10. Identical reference numerals denote identical features in FIGS. 8 and 10.

As shown in FIG. 10, the buffer amplifier 7a includes an amplification transistor QA, preferably an n-channel MOS transistor, a p-channel negative MOS transistor QL (transistor QL), a p-channel MOS transistor QC (transistor QC), an n-channel constant-current MOS transistor QB (constant-current transistor QB), and an accumulation capacitor CD.

The gate of transistor QC is connected to the clock line 5b, the source of transistor QC is connected to a first terminal of the accumulation capacitor CD. The first terminal of the accumulation capacitor is also connected to the gate of transistor QL. A second terminal of the accumulation capacitor CD is connected to ground. The drain of transistor QC is connected to the drain of the amplification transistor QA, to the drain of the transistor QL, and to the gate of the constant-current transistor QB.

The source of transistor QL is connected to the power supply voltage VDD. The source of the amplification transistor QA is grounded. The gate of the amplification transistor QA is connected to the source of the constant-current transistor QB and the vertical read line 2a. The drain of transistor QB is connected to output line 8a of the buffer amplifier 7a.

Operation of the buffer amplifier 7a is described with reference to FIGS. 9 and 10. When the drive pulse φRV is at a low level, the reset switch QR1 is in an ON state. Therefore, the vertical-read output line 2a is biased to VR. Accordingly, the gate of the amplification transistor QA is also biased to VR.

During period t11, when the drive pulse φRV is at a high level, the clock line 5b goes to a low level, and transistor QC is turned on. The gate and drain of the transistor QL are connected to one another.

More specifically, the amplification transistor QA and transistor QL operate as an inversion amplification circuit in which amplification transistor QA and transistor QL operate as an amplification element and a negative element, respectively. The voltages of the gate and drain of transistor QL are automatically adjusted such that current flowing in the amplification transistor QA, when the gate-source voltage of the amplification transistor QA is VR, is caused to flow into transistor QL. In this adjustment state, the gate voltage of transistor QL is accumulated in the voltage accumulation capacitor CD.

During period t12, the drive pulse φRV is at a low level and the clock line 5b goes to a high level. For this reason, both the reset switch QR1 and the transistor QC are turned off. In this manner, although both the vertical read line 2a and the gate of transistor QL are in a floating state, the bias state set for the vertical read line 2a and the gate of transistor QL is maintained by the effects of the parasitic capacitance of the vertical read line 2a and the voltage accumulation capacitor CD.

Specifically, the vertical read line 2a and, therefore, the gate of amplification transistor QA, is biased to VR. The gate of transistor QL maintains a gate voltage such that current flowing in the amplification transistor QA, when the gate-source voltage of the amplification transistor QA is set to VR, flows in transistor QL.

Since the drive pulse φV1 is set to a low level during period t12, the transistor QP of the pixel section is turned on, the current signals of the first row of pixels 1 are output to the corresponding vertical read line to be input to the source of the constant-current transistor QB. As a result, the gate of the constant-current transistor QB is automatically biased to cause transistor QB to allow the output current signals of the pixels 1 to flow from an output line 8a of the buffer amplifier 7a. As a result, the buffer amplifier 7a operates as a current buffer amplifier during period t12.

Although the thermosensing elements of this embodiment are preferably bolometers, the thermosensing elements alternatively can be p-n junction diodes or Schottky barrier diodes in which a current flowing in the element varies with changes in temperature.

Figure 11:
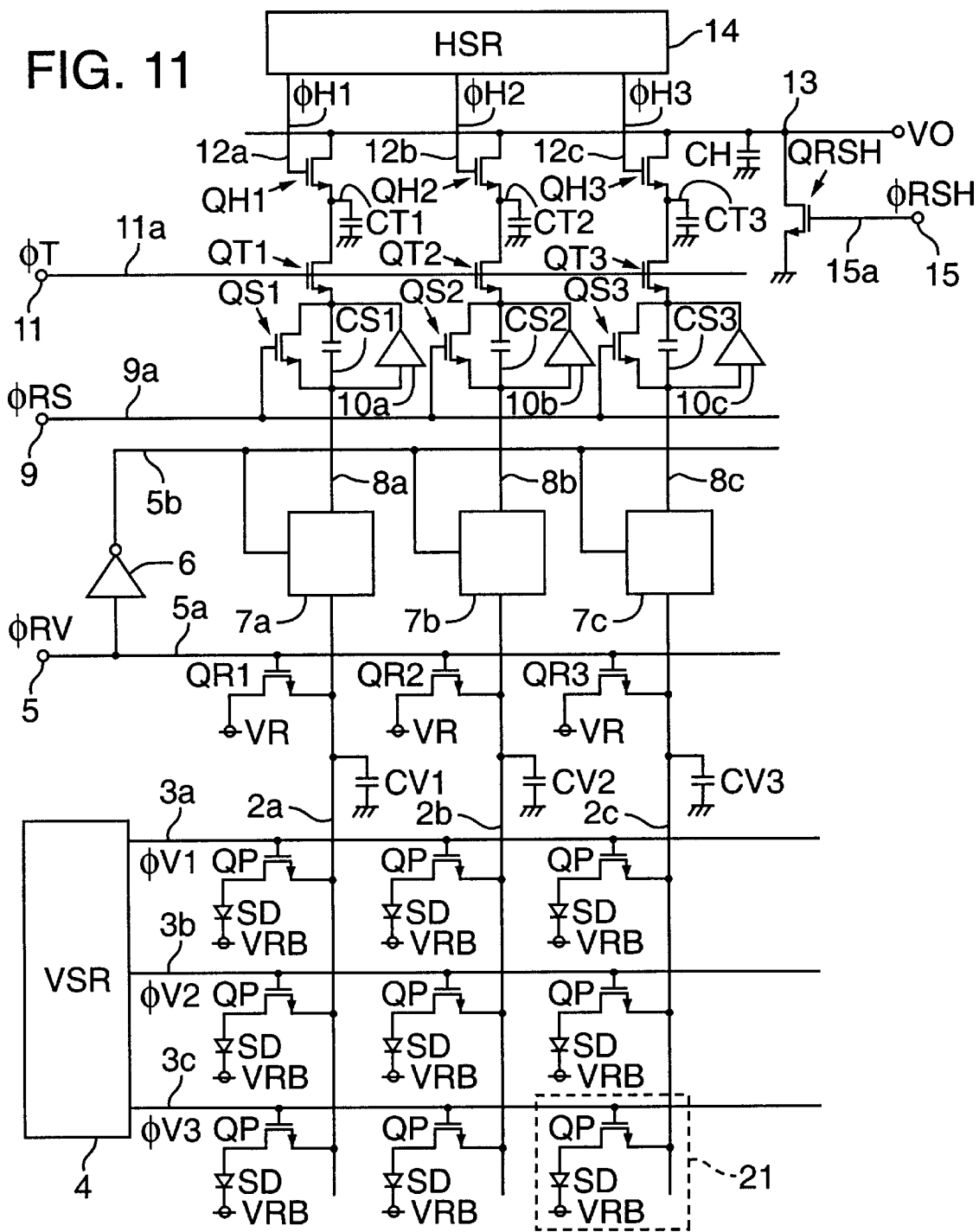
FIG. 11 is a schematic block circuit diagram of a fifth representative embodiment of the thermal infrared image sensor of the present invention.

FIG. 11 shows a thermal infrared image sensor according to the sixth representative embodiment of the present invention. The fifth and sixth embodiments differ from one another in that the sixth embodiment employs Schottky barrier diodes SD as thermosensing elements of the pixels. Identical reference numerals in FIGS. 8 and 11 denote the same features in each of the thermal infrared image sensors.

In the thermal infrared image sensor shown in FIG. 11, although Schottky barrier diodes SD are used as the thermosensing elements, the operation of the Schottky barrier diodes SD may be described by using the pulse timing chart shown in FIG. 9 in the same manner as described for the fifth embodiment.

Referring to FIGS. 9 and 11, during periods t11 to t13, current signals of pixel 21 columns are output to vertical read lines 2a–2c and are input to integration circuits through the buffer amplifiers 7a–7c. The current signals are integrated during period t12 to be converted into voltage signals (FIG. 9). Thereafter, these voltage signals are accumulated in the accumulation capacitors CT1–CT3 completing the vertical reading operation of the first row of pixels 21 and awaiting the horizontal reading operation.

During periods t21 to t23, the voltage signals, which are accumulated in accumulation capacitors CT1–CT3 of the first row of pixels 21, are sequentially read onto an output terminal VO through a horizontal read line 13, and a horizontal reading operation of the first row of pixels 21 is performed. At the same time, like a vertical reading operation of the first row of pixels 21, a vertical reading operation of the second row of pixels 21 is performed.

The horizontal reading operation of the first row of pixels 21 and the vertical reading operation of the second row of pixels 21 during periods t21 to t23 are similarly performed during periods t31 to t33 for a horizontal reading operation of the second row of pixels 21 and a vertical reading operation of the third row of pixels 21. In addition, a horizontal reading operation of the third row of pixels 21 is similarly performed during periods t41 to t43, and the reading operations for all the pixels are completed.

Referring to FIG. 11, when a power supply voltage VRB and a reset voltage VR are selected to satisfy VRB<VR, current signals ISD are read from the pixels 21. In this case, the Schottky barrier diodes SD can be biased in a forward direction and the sensor sensitivity is improved. A forward current signal in the diode is generally larger than a reverse current signal therein.

It is known to those skilled in the art that "shot" noise is included in the current signal ISD of each pixel 21, and that the "shot" noise is in proportion to the square root of the current signal ISD. Therefore, when the Schottky barrier diodes of the pixels 21 are biased in the forward direction, the current signals ISD can be increased. However, since the "shot" noise increases by only a magnitude which is in proportion to the square root of the current signal, a signal/noise ratio is still increased.

Here, the current signals ISD output from the pixels 21 may be expressed by Equation (4) as follows:

$$ISD = I0 \cdot (\exp(q(VR - VRB)/kT) - 1) \qquad (4)$$

where I0 is the reverse saturation current, q is the charge of the electrons, k is Boltzmann's constant, and T is the temperature in Kelvin.

As expressed in Equation (4), the current signals ISD corresponding to an increase in temperature caused by infrared irradiation are output from the pixels 21. In this case, when the VR of the vertical read lines vary, the current signals ISD vary, so that so-called fixed-pattern noise is generated. However, since current signals are output after the potentials of the vertical read lines are equally reset to VR without being adversely affected by circuits that follow, the current signals ISD do not vary, and fixed-pattern noise is not generated.

In general, internal resistors are serially present in diodes. For this reason, if a vertical reading operation and a horizontal reading operation are simultaneously performed in the prior-art sensors, it is impossible to perform a high-speed reading operation under the influence of the internal resistances of the Schottky barrier diodes SD of the pixels 21 and the parasitic capacitors of the vertical read lines. However, in the sensor of the present invention, the vertical reading operation and the horizontal reading operation for the pixels 21 are independently performed. For this reason, even when the Schottky barrier diodes SD of the pixels 21 include internal resistors, the reading operation is performed at a high speed.

Since a plurality of horizontal read lines need not be arranged in the sensor of the present invention, the circuit is simplified, and a reduction in cost is achieved.

In the sixth embodiment, the diodes serving as the thermosensing elements are Schottky barrier diodes. However, the embodiment is not limited to such and can be similarly applied to conventional p-n junction diodes.

Figure 12:
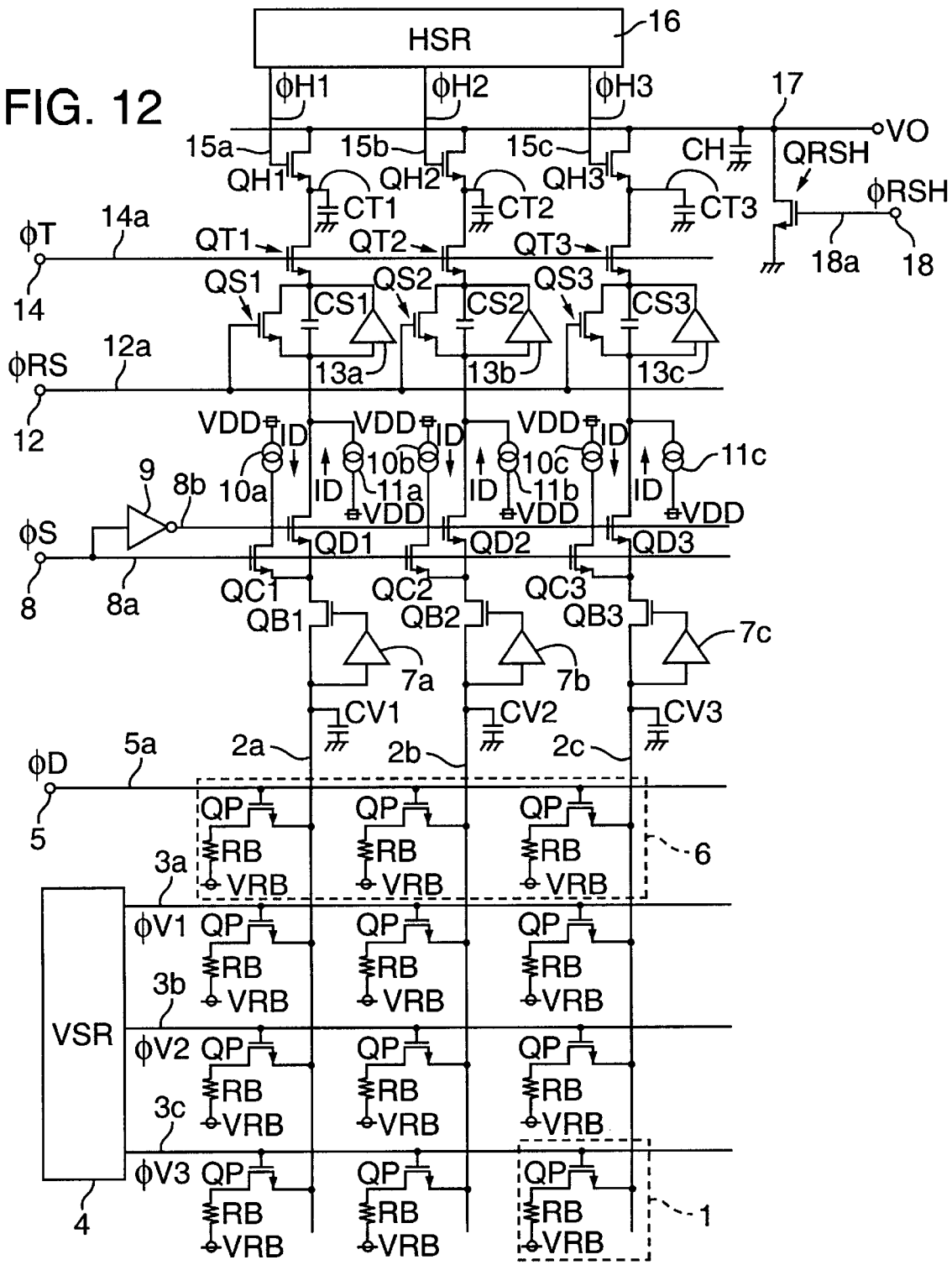
FIG. 12 is a schematic block circuit diagram of a sixth representative embodiment of the thermal infrared image sensor of the present invention.

FIG. 12 shows a thermal infrared image sensor according to the seventh representative embodiment of the present invention. In the thermal infrared image sensor shown in FIG. 12, for descriptive convenience, twelve pixels 1 are arranged in a matrix comprising four rows and three columns. Each pixel 1 includes a bolometer RB serving as a thermosensing element and a switch QP, such as a p-channel MOS transistor, to selectively output a current signal flowing from the bolometer RB to each corresponding vertical signal line. When switch QP is turned on, the current signal is read from the bolometer RB.

Pixels 1 on a pixel row 6 are shielded from infrared irradiation. The pixels may be shielded by a well-known method wherein the surfaces of the pixels are covered with a metal film, such as aluminum, to reflect infrared irradiation. The shielded pixels 1 of pixel row 6 are termed "dummy" pixels, while the non-shielded pixels are termed "effective" pixels 1.

In the thermal infrared image sensor shown in FIG. 12, the effective pixels are arranged in three rows and three columns, and the dummy pixels 6 are arranged in one row and three columns.

A power supply voltage VRB is applied to one terminal of the bolometer RB in the respective pixel, and the drain of the switch QP is connected to the other terminal of the bolometer RB. The sources of the switch QP are connected to vertical read lines 2a–2c along columns of the pixel matrix.

The gates of the switches QP of the rows of effective pixels are connected to clock lines 3a–3c that are connected to a vertical reading circuit 4. When drive pulses φV1–φV3 are sent from the vertical reading circuit 4 to the switches QP, the rows of switches are sequentially operated.

The gates of the switches QP of the dummy pixel row 6 are connected to a drive-pulse-generation circuit (not shown) through a clock line 5a and a terminal 5. When a drive pulse AD is sent from the clock-pulse-generation circuit to the gate of the switches QP, switch QP is operated, and only the dummy pixel row 6 is selected, independently of the rows of effective pixels.

The vertical read lines 2a–2c are connected to the inputs of amplifiers 7a–7c and to the sources of constant-current transistors QB1–QB3. In addition, the gates of the constant-current transistors QB1–QB3 are connected to outputs of the amplifiers 7a–7c.

More specifically, the constant-current transistors QB1–QB3 are connected in such a manner that negative feedback is performed from the outputs of the amplifiers 7a–7c to the inputs thereof. Therefore, the gates of the constant-current transistors QB1–QB3 are automatically biased such that currents input to their sources are directly output from their drains. Accordingly, the constant-current transistors QB1–QB3 and the amplifiers 7a–7c operate as current-buffer amplifiers.

Parasitic capacitors CV1–CV3 are preferably placed along vertical read lines 2a–2c (FIG. 12). The drains of the constant-current transistors QB1–QB3 are connected to first constant-current sources 10a–10c for biasing the pixels 1 through transistors QC1–QC3, respectively. A power supply voltage VDD is applied to the constant-current sources 10a–10c to cause a constant current ID to flow.

The gates of the transistors QC1–QC3 are connected to a drive-pulse-generation circuit (not shown) through a clock line 8a and a terminal 8. When a pulse φS is sent from the drive-pulse-generation circuit to the gates of the transistors QC1–QC3, the transistors QC1–QC3 are operated.

The drains of the constant-current transistors QB1–QB3 are also connected to second constant-current sources 11a–11c for removing background light components of the current signals of the pixels 1 via transistors QD1–QD3. In addition, the drains of the constant-current transistors QB1–QB3 are connected to the input terminals of integration amplifiers 13a–13c, to one terminal of the corresponding integration capacitors CS1–CS3, and to the sources of capacitor-reset transistors QS1–QS3.

A power supply voltage VDD is applied to the constant-current sources 11a–11c to correlate them with the constant current sources 10a–10c. Accordingly, a constant current ID, that is always equal to that of the constant-current sources 10a–10c, is caused to flow in the constant-current sources 11a–11c.

The gates of the transistors QD1–QD3 are connected to the output of an inverter 9 through a clock line 8b. The input of the inverter 9 is connected to a drive-pulse-generation circuit (not shown) through the clock line 8a and the terminal 8. When a pulse, obtained by inverting the pulse φS sent from the drive-pulse-generation circuit, is sent to the gates of transistors QD1–QD3, they are turned on. Accordingly, transistors QC1–QC3 and transistors QD1–QD3 are complementarily operated.

The gates of the capacitor-reset transistors QS1–QS3 are connected to a drive-pulse-generation circuit (not shown) through a clock line 12a and a terminal 12. When a pulse φRS is sent from the drive-pulse-generation circuit to the gates, the capacitor-reset transistors QS1–QS3 are turned on.

Integration circuits preferably include integration amplifiers 13a–13c, integration capacitors CS1–CS3, and capacitor-reset transistors QS1–QS3, arranged in columns. The input terminals of the integration amplifiers 13a–13c, one terminal of the integration capacitors CS1–CS3, and the sources of the capacitor-reset transistors QS1–QS3 are connected to the input terminals of the integration circuits. The output terminals of the integration amplifiers 13a–13c, the other terminals of the integration capacitors CS1–CS3, and the drains of the capacitor-reset transistors QS1–QS3 are connected to the output terminals of the integration circuits. These integration circuits integrate current signals which are obtained by first removing the background light components of the current signals output from the buffer amplifiers.

The outputs of the integration circuits are connected via transistors QT1–QT3 to accumulation capacitors CT1–CT3. Each capacitor CT1–CT3 has one terminal grounded. The integration circuits are, thus, connected to a horizontal read line 17 through horizontal read switches QH1–QH3. In this manner, voltage signals accumulated in the accumulation capacitors CT1–CT3 are sequentially output from an output terminal VO through the horizontal read switches QH1–QH3.

The gates of the switches QT1–QT3 are connected to a drive-pulse-generation circuit (not shown) through a clock line 14a and a terminal 14. When a pulse φT sent from the drive-pulse-generation circuit is delivered to the gates of transistors QT1–QT3, the switches QT1–QT3 are operated.

The gates of the horizontal read switches QH1–QH3 are connected to horizontal-selection signal lines 15a–15c connected to a horizontal scanning circuit 16. A horizontal read operation is controlled by drive pulses φH1–φH3 sent from the horizontal scanning circuit 16 through the horizontal-selection signal lines 15a–15c.

In addition, the drain of a reset switch QRSH is connected to the horizontal read line 17, and the source of the reset switch QRSH is grounded. The gate of the reset switch QRSH is connected to a drive-pulse-generation circuit (not shown) through a clock line 18a and a terminal 18. When a drive pulse φRSH is sent from the drive-pulse-generation circuit to the gate of the reset switch QRSH, the reset switch QRSH is operated.

A parasitic capacitor CH is preferably connected along horizontal read line 17 (FIG. 12).

Figure 13:
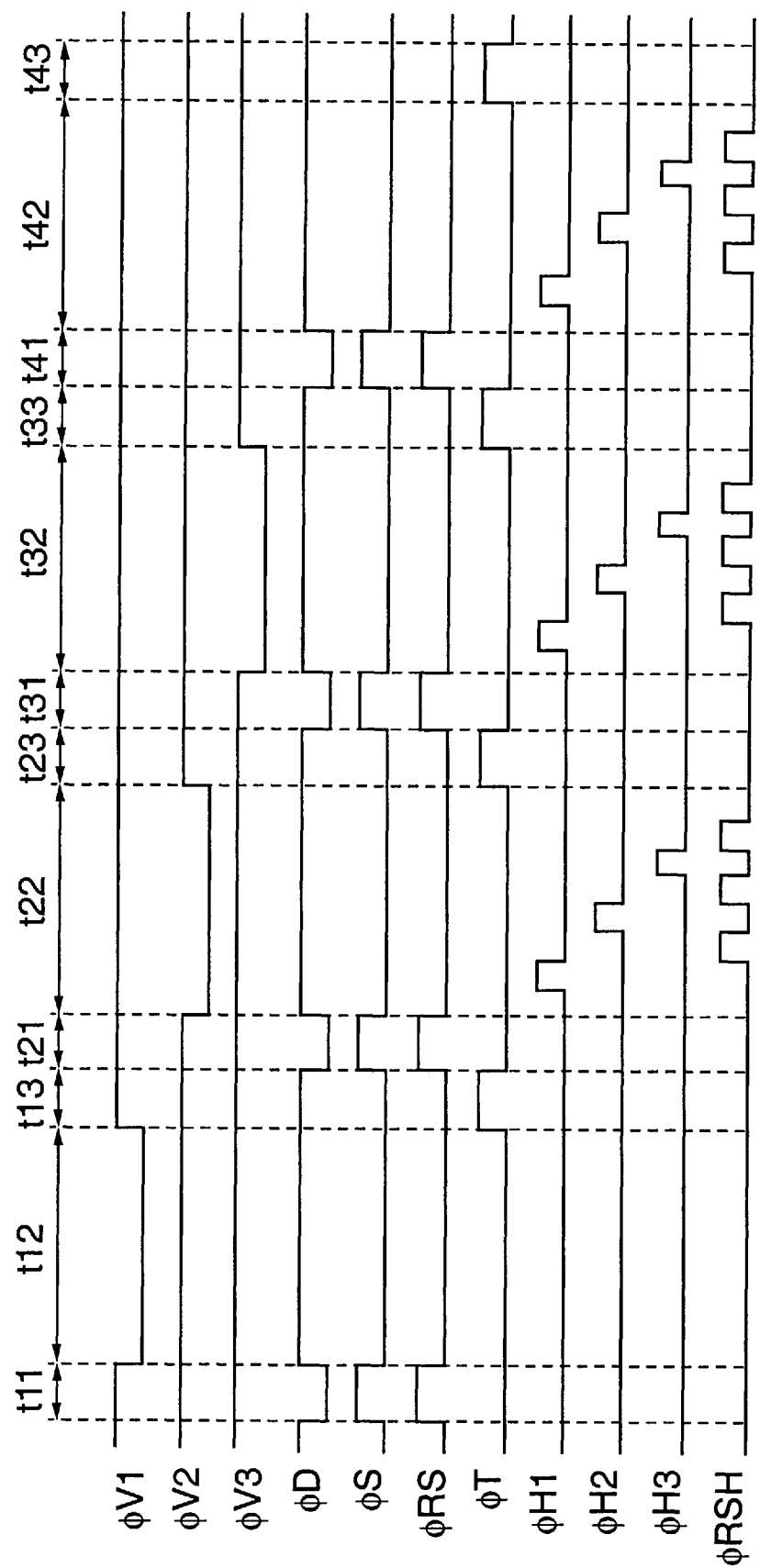
FIG. 13 is a pulse timing chart for the thermal infrared image sensor shown in FIG. 12.

Operation of the thermal infrared image sensor shown in FIG. 12 is described with reference to a pulse timing chart shown in FIGS. 12 and 13. Referring to FIG. 13, periods t11 to t13 indicate vertical reading operations of the effective first row of pixels, periods t21 to t23 indicate horizontal-reading operations of the effective first row of pixels and vertical reading operations of the effective second row of pixels, periods t31 to t33 indicate horizontal-reading operations of the effective second row of pixels and vertical reading operations of the effective third row of pixels, and periods t41 to t43 indicate horizontal reading operations of the effective third row of pixels.

As shown in FIG. 13, when drive pulses φV1–φV3 are at a high level during period t11, the transistors QP of the effective pixels are off. When the drive pulse φD is at a low level, the transistors QP of the dummy pixel row 6 are on. In addition, when the drive pulse φS is at a high level, the transistors QC1–QC3 are on, and the transistors QD1–QD3 are off. Therefore, since the constant-current transistors QB1–QB3 and the amplifiers 7a–7c operate as current-buffer amplifiers, the potentials of the vertical read lines 2a–2c are biased such that output current signals from the dummy pixels are equal to ID.

More specifically, since the output current signals from the dummy pixels 6 are equal to current signals corresponding to the background light components of the signals of the effective pixels, the potentials of the vertical read lines 2a–2c are biased such that the current signals corresponding to the background light components of the effective pixels 1 are equal to ID.

As shown in FIG. 13, since the drive pulse φRS is at a high level during period t11, the capacitor-reset transistors QS1–QS3 are on, and charges in the integration capacitors CS1–CS3 are reset. In addition, since the drive pulse φT is at a low level, the transistors QT1–QT3 are off.

When drive pulse φD is set to a high level during period t12, the transistors QP of dummy pixel row 6 are turned off. Since the drive pulse φV1 is set to a low level, the transistors QP of the first row of effective pixels are turned on and the current signals are output to the vertical read lines 2a–2c. Although the current signals of the pixels 1 are input to current-buffer amplifiers (i.e., constant-current transistors QB1–QB3 and amplifiers 7a–7c), the constant-current transistors QB1–QB3 are respectively connected to the amplifiers 7a–7c such that negative feedback is performed from the outputs of the amplifiers 7a–7c to the inputs thereof. For this reason, the vertical read lines 2a–2c are kept biased such that the current signals corresponding to the background light components of the signals of the effective pixels 1 are equal to ID.

It is well known to those persons skilled in the art that the above-described current-buffer amplifiers typically have inherent, varying offsets. For this reason, according to the present invention, during period t11, the potentials of the vertical read lines 2a–2c serving as the inputs of the buffer amplifiers are reset to potentials such that current signals corresponding to the background light components of the signals of the effective pixels 1 are equal to ID. The potentials of the vertical read lines can be independently determined without being affected by circuits that follow, such as an integration circuit.

Since the drive pulse φS is set to a low level during period t12, the transistors QC1–QC3 are turned off, and the transistors QD1–QD3 are turned on. Current signals output from the effective pixels 1 are determined by the resistances of the bolometers and voltages at both the ends of the bolometers. The potentials of the vertical read lines 2a–2c are reset to potentials such that the current signals corresponding to the background light components of the signals of the pixels 1 are equal to ID, and the potentials at both ends are fixed. Since the resistances of the bolometers change depending on changes in temperature caused by infrared irradiation, current signals corresponding to the temperature changes are output from the pixels 1.

The current signal generally includes a component (hereinafter referred to as a synthesized current signal (ID+IS)) corresponding to the sum of a current signal component (referred to as a background light current signal (ID)) depending on background light and a current signal corresponding to a change in temperature caused by infrared irradiation. The background light current component (ID) is equal to the current value ID of the first current sources 10a–10c.

The synthesized current signals (ID+IS) output to the vertical read lines 2a–2c are input to the integration circuits of respective pixel columns and the second current sources 11a–11c through the buffer amplifiers. The transistors QD1–QD3 are turned on. Since currents equal to the background light current signal ID are output from the second current sources 11a–11c, the background light current signal is subtracted from the synthesized current signal (ID+IS). As a result, only the current signals IS corresponding to an increase in temperature caused by infrared irradiation are input to the integration circuits.

More specifically, when the synthesized current signals (ID+IS) and the output currents from the second current sources are superposed, subtraction expressed by:

$$(ID+IS)-ID=IS$$

is performed. Only the current signals IS obtained by removing the background light current signals ID from the synthesized current signal are input to the integration circuits. Preferred embodiments of the constant current sources 10a–10c and the second current sources 11a–11c and details regarding background light removal are described below.

Since the drive pulse φRS is set to a low level during period t12, the capacitor-reset transistors QS1–QS3 are turned off, and the current signals IS input to the integration circuits are integrated by pixel columns during period t12 by the integration capacitors CS1–CS3, to output voltage signals.

At the end of period t12, the drive pulse φV1 is set to a high level, the transistors QP of the first row of effective pixels are turned off, and the integration operation is stopped.

Since the drive pulse φT is set to a high level during period t13, the transistors QT1–QT3 are turned on, and the output voltage signals from the integration circuits are accumulated in the accumulation capacitors CT1–CT3, respectively.

At the end of period t13, the drive pulse φT is set to a low level, the transistors QT1–QT3 are turned off, and the voltage signals are held in the accumulation capacitors CT1–CT3, respectively. In this manner, the vertical reading operation for the first row of effective pixels is completed.

The above-mentioned vertical reading operation for the first row of effective pixels with respect to periods t11 to t13 is similarly performed for the second row of effective pixels during periods t21 to t23. However, the vertical reading operation of the second row of effective pixels and a horizontal reading operation for the first row of effective pixels are simultaneously but independently performed during period t22.

Specifically, the drive pulse φT is set to a low level during periods t21 and t22, and transistors QT1–QT3 are turned off. For this reason, a horizontal reading operation of the voltage signals, which are held in the accumulation capacitors CT1–CT3, of the first row of effective pixels and a vertical reading operation of the second row of effective pixels are independently performed.

The horizontal reading operation for the first row of effective pixels during period t22 is described below. Since the vertical reading operation for the second row of effective pixels is the same as the vertical reading operation for the first row of effective pixels during periods t11 to t13, a description thereof is omitted.

The high-level drive pulses φH1–φH3 are sent from the horizontal scanning circuit 16 during period t22, and the horizontal read switches QH1–QH3 are sequentially turned on. The voltage signals, which are held in the accumulation capacitors CT1–CT3, of the first row of effective pixels are sequentially output to the output terminal VO through the horizontal read line 17.

When the voltage signals are read onto the horizontal read line 17, some of the voltage signals are held in the parasitic capacitor CH to remain on the horizontal read line 17. For this reason, the drive pulses φH1–φH3 sent from the horizontal scanning circuit 16 are sequentially applied (at a high level). Each time the voltage signals accumulated in the accumulation capacitors CT1–CT3 are output to the output terminal VO through the horizontal read line 17, the drive pulse φRSH is applied to the reset switch QRSH to operate the reset switch QRSH, thereby resetting (initializing) the horizontal read line 17.

The horizontal reading operation for the first row of effective pixels and the vertical reading operation of the second row of effective pixels during periods t21–t23 are similarly performed during periods t31 to t33 for a horizontal reading operation for the second row of effective pixels and a vertical reading operation for the third row of effective pixels. In addition, a horizontal reading operation for the third row of effective pixels is similarly performed during periods t41 to t43, and the reading operations for all the pixels are completed.

As described above, again, the vertical and horizontal reading operations for the pixels 1 are independently performed.

After the background light current signal ID is removed from the synthesized current signal (ID+IS), only the current signal IS is integrated, the gain of the integration circuit can be increased regardless of the background light component.

Since the pixels are biased by a constant current in advance such that the current outputs corresponding to the background light components ID of the pixels do not vary from pixel unit to pixel unit, and no fixed-pattern noise is generated.

Figure 14:
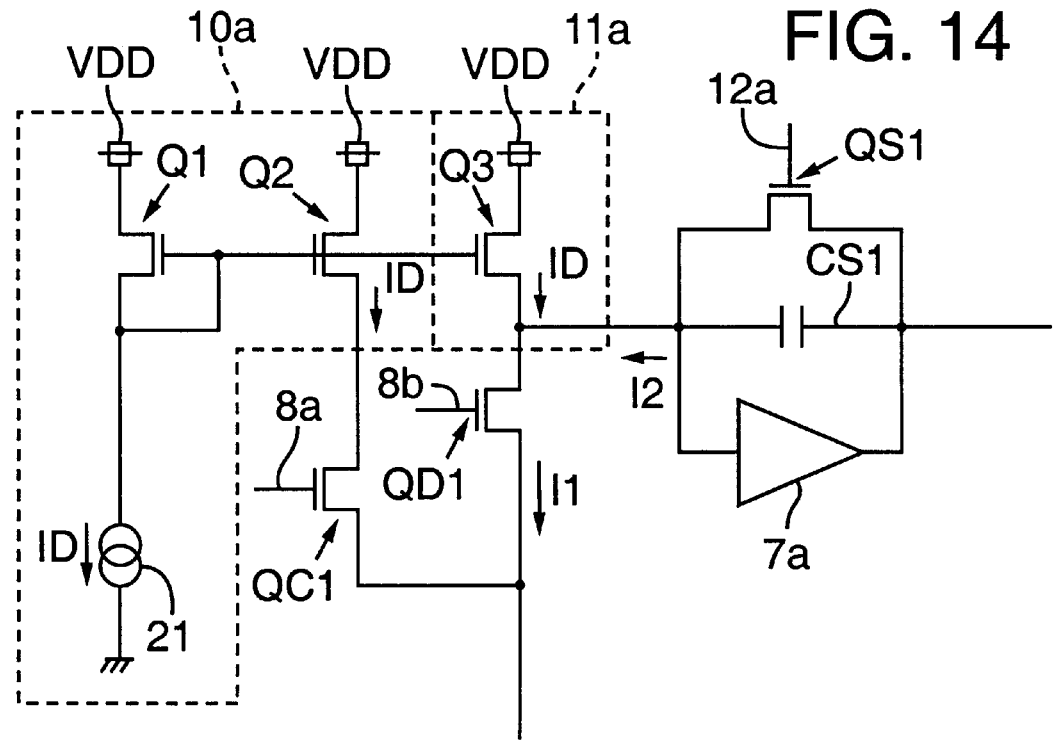
FIG. 14 is a schematic circuit diagram of a first current source and a second current source that are used in the thermal infrared image sensor shown in FIG. 12.

FIG. 14 shows a preferred embodiment of the first current sources 10a–10c and the second current sources 11a–11c shown in FIG. 12. Referring to FIG. 14, for descriptive convenience, only the current sources 10a and 11a are shown. Identical reference numerals in FIGS. 12 and 14 denote the same features of the current sources.

As shown in FIG. 14, the first constant current source 10a is primarily a p-channel bias MOS transistor Q1, a p-channel constant-current MOS transistor Q2 of the same size as that of transistor Q1, and a constant-current source 21. The second constant- current source 11a primarily includes a p-channel constant-current transistor Q3 of the same size as transistor Q1.

The gate of transistor Q1 is connected to the drain of the transistor Q1 and one terminal of the constant-current source 21. The gate of Q1 is also connected to the gates of the constant-current transistors Q2 and Q3. The other terminal of the constant-current source 21 is grounded.

The source of transistor Q1 and the sources of the constant-current transistors Q2 and Q3 are connected to the power supply VDD. The drain of the constant-current transistor Q2 is connected to the constant-current transistor QC1. The drain of the constant-current transistor Q3 is connected to the drain of the transistor QD1.

Specifically, transistor Q1 and the constant-current transistors Q2 and Q3 constitute a well-known current mirror circuit. The current value of the constant current source 21 is set to ID, the drain currents of the constant-current transistors Q2 and Q3 are correlated with one another because the sizes of the transistor Q1 and the constant-current transistors Q2 and Q3 are equal to one another. As a result, the currents ID, which are equal to one another, flow in these transistors.

The operation of a background light removing operation in the thermal infrared image sensor shown in FIG. 12 is described with reference to FIG. 14. During period t11, the constant-current transistor QC1 is ON because the drive pulse φS is at a high level. Therefore, the current ID is output from the drain of transistor Q2 through the constant-current transistor QC1, and the potential of the vertical read line 2a is biased such that the background light current signals of the pixels 1 are set to ID.

During period t12, the drive pulse φS is set to a low level, the clock line 8a goes to a low level, and the clock line 8b goes to a high level. The constant-current transistor QC1 is turned off and the transistor QD1 is turned on. In addition, during period t12, the drive pulse φV1 also goes to a low level, the switch transistors QP of the first row of effective pixels are turned on, and a current signal I1 of the first row of effective pixels flows through transistor QD1. Since the constant-current transistor Q3 always outputs the current ID, a current signal I2 corresponding to the difference between the current signal I1 and the drain current ID of the constant-current transistor is input to the integration circuits. That is, a subtraction process expressed by I2=I1−ID is performed.

The current signal I1 is a synthesized current signal (ID+IS) corresponding to the sum of the background light current signal ID and the current signal IS. For this reason, a subtraction process of I2=(ID+IS)−ID=current signal IS is performed, thereby removing the background light component of the signal.

Although, with reference to FIG. 14, the constant-current transistors Q2 and Q3 (having equal sizes) were described, the present invention is not limited to such an embodiment.

For example, the size of the constant-current transistor Q2 may be larger than the size of transistor Q3, and a current ID set such that the drain current of transistor Q2 is always larger than the drain current of transistor Q3.

Figure 15:
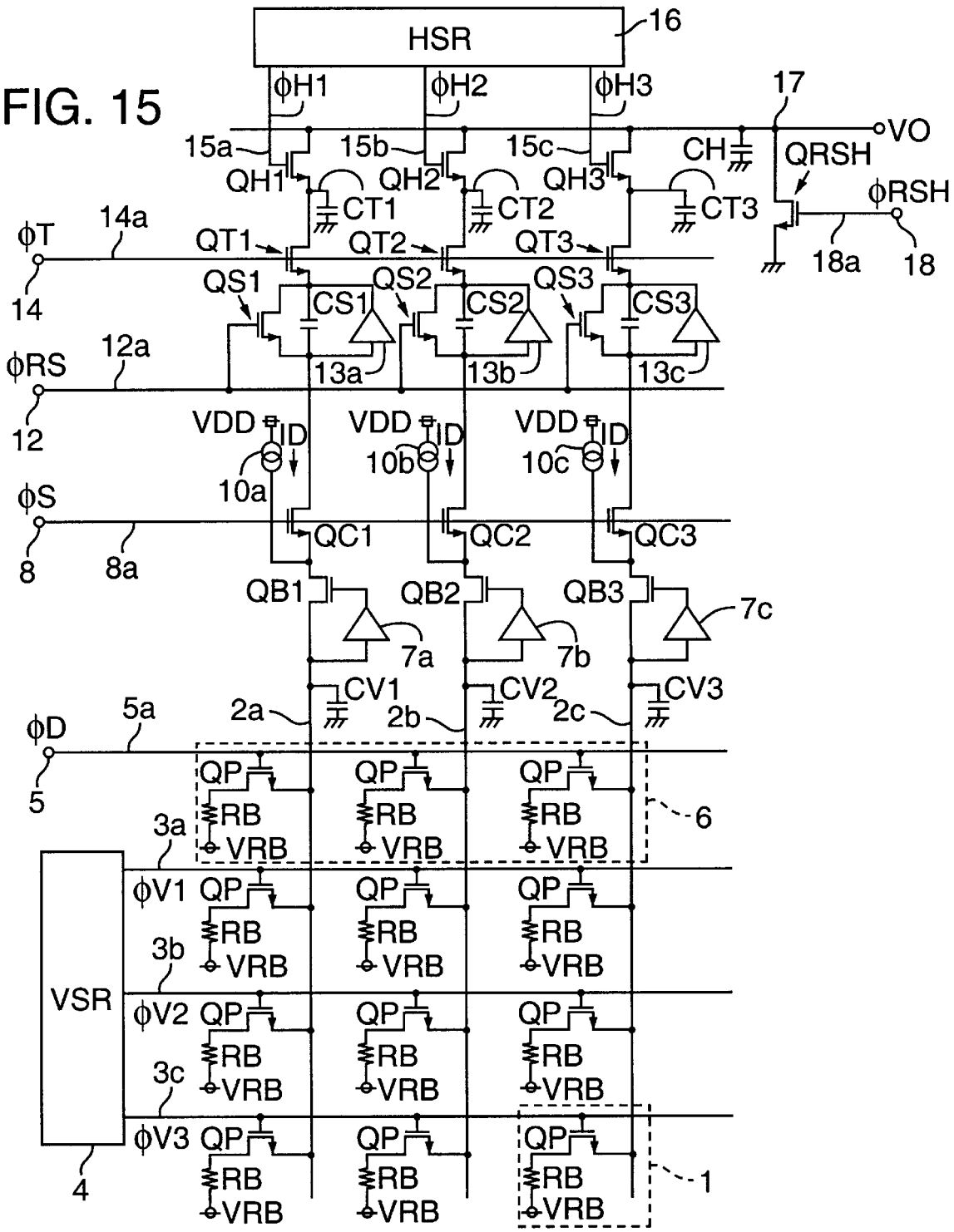
FIG. 15 is a schematic block circuit diagram of a seventh representative embodiment of the thermal infrared image sensor of the present invention.

FIG. 15 shows a thermal infrared image sensor according to the eighth representative embodiment of the present invention. The seventh and eighth embodiments differ from one another as follows. In the eighth representative embodiment, the current-bias device also serves as the background light removing device. Identical reference numerals in FIGS. 12 and 15 denote identical features of the sensors.

Figure 16:
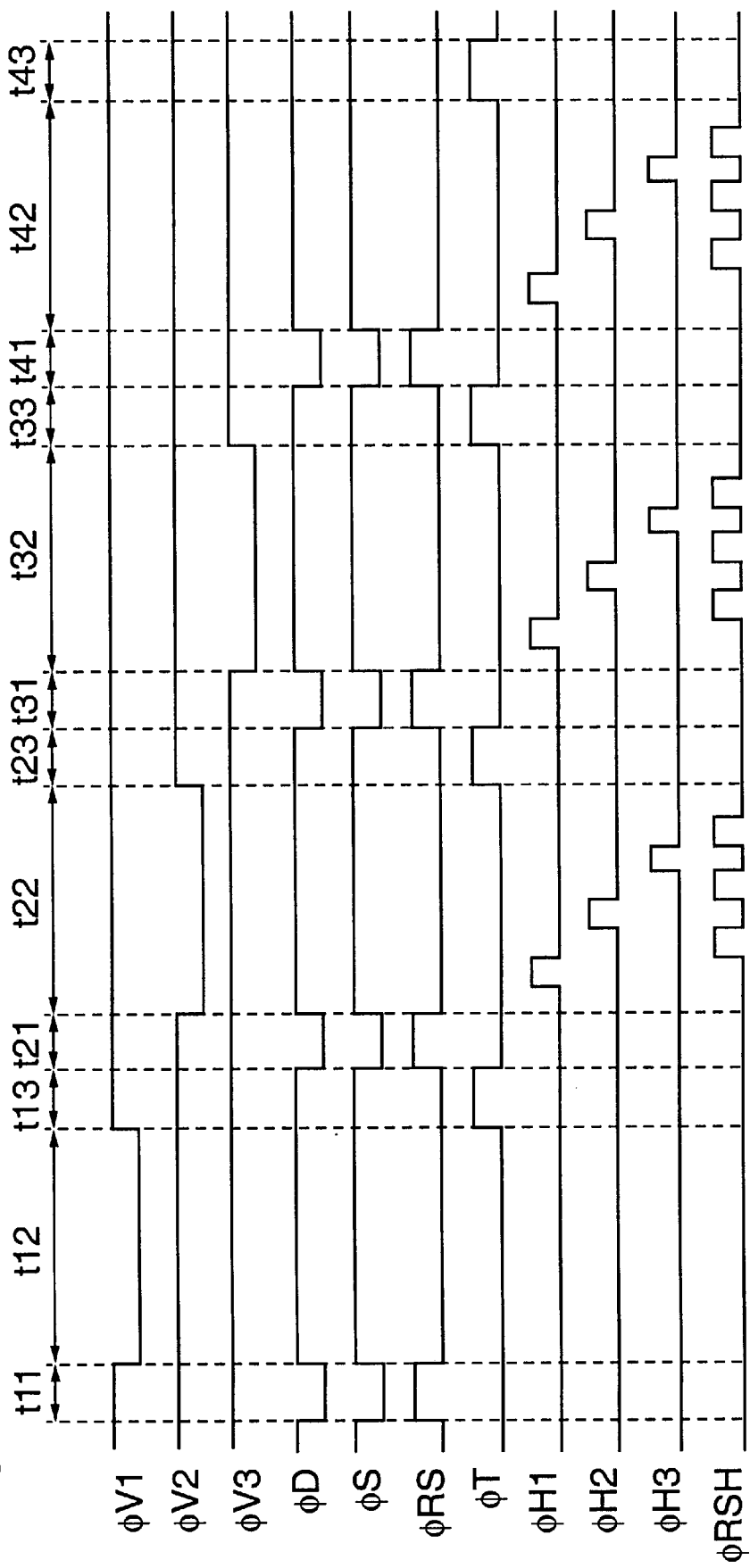
FIG. 16 is a pulse timing chart for explaining an operation the thermal infrared image sensor shown in FIG. 15.

In the thermal infrared image sensor shown in FIG. 15, although the current-bias device also serves as the background light removing device, the operation of the current-bias device is described by using a pulse timing chart shown in FIG. 16 in the same manner as in the seventh embodiment.

As shown in FIG. 16, a drive pulse φS is set to a low level during periods t11, t21, and t31 to turn transistors QC1–QC3 on, and the drive pulse φS is set to a high level during periods t12, t22, and t32 to turn the transistors QC1–QC3 on. Therefore, as in the seventh embodiment, only a signal component which is free from a background light component and that corresponds to an increase in temperature caused by infrared irradiation, can be output.

In this case, since the current-bias device and the background light removing device are constituted by the same circuit, the circuit is reduced in scale.

In the seventh and eighth embodiments, the thermosensing elements are described as bolometers. However, the sensors of the present invention may be similarly applied to elements such as p-n junction diodes or Schottky barrier diodes.

Figure 17:
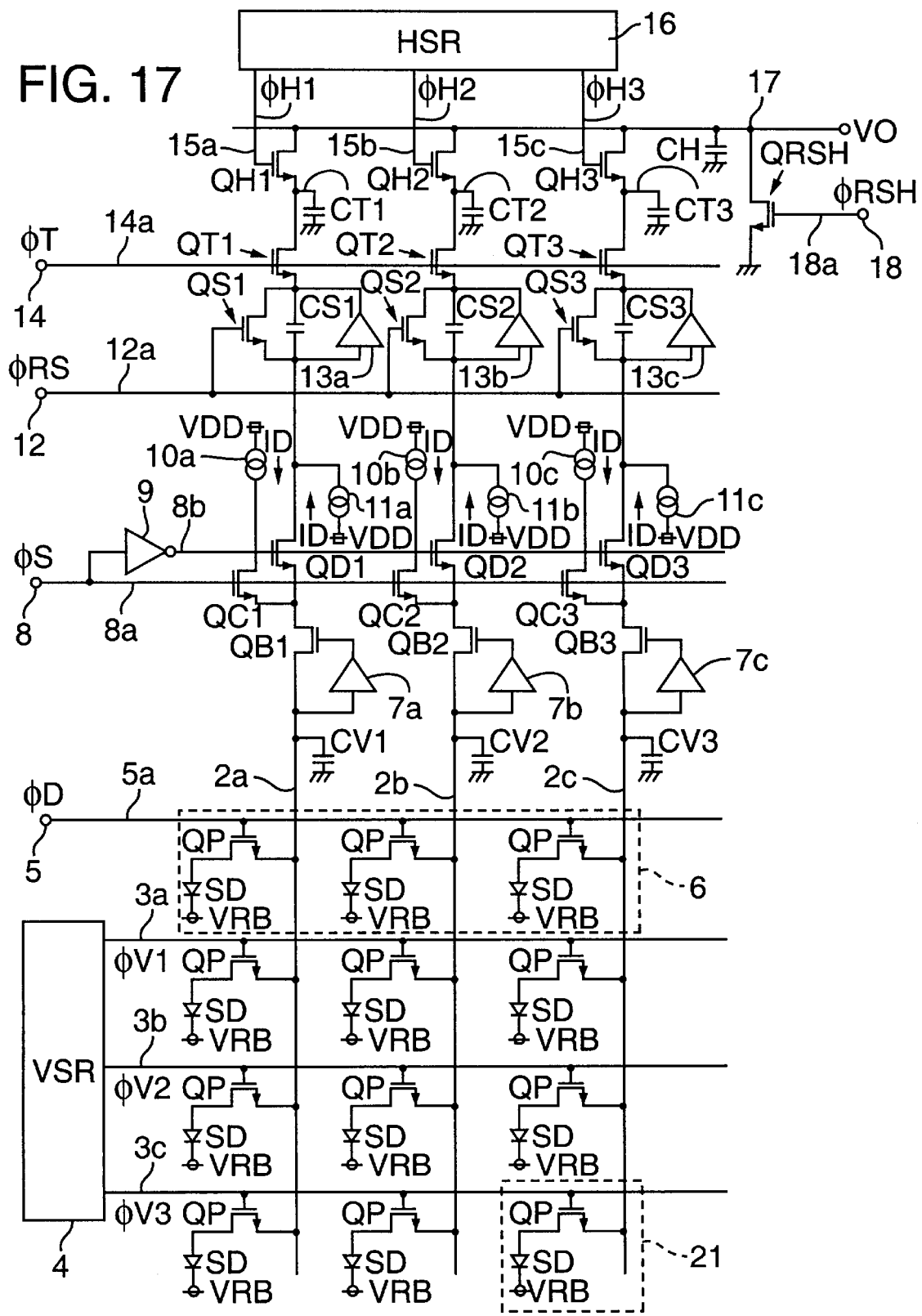
FIG. 17 is a schematic block circuit diagram of an eighth representative embodiment of the thermal infrared image sensor of the present invention.

FIG. 17 shows the ninth representative embodiment of the thermal infrared image sensor of the present invention. The seventh and ninth embodiments differ in that Schottky barrier diodes SD are used as thermosensing elements in the ninth embodiment. Again, identical reference numerals are used for identical features in FIGS. 12 and 17.

In the thermal infrared image sensor shown in FIG. 17, although Schottky barrier diodes SD are used as thermosensing elements, the operation of the Schottky barrier diodes SD can be described by using the pulse timing chart shown in FIG. 13 in the same manner as in the seventh embodiment.

Specifically, during periods t11 to t13, by using dummy pixel row 6, vertical read lines 2a–2c are reset to a potential such that current signals corresponding to the background light components of the pixels 21 are equal to ID. Synthesized current signals (ID+IS) of the first row of effective pixels are output to the vertical read lines 2a–2c by pixel column.

As described above, after the synthesized current signals pass through current-buffers constituted by amplifiers 7a–7c and the like, background light components are removed from the synthesized current signals. More specifically, the synthesized current signals (ID+IS) and output currents from second current sources, i.e., background light current signals ID, are simply superposed such that a subtraction expressed by (ID+IS)−ID=IS is performed, thereby obtaining the current signals IS which are free from the background light current signals. Only the current signals IS are input to the integration circuits and integrated over period t12 to be converted into voltage signals. The voltage signals are accumulated in the accumulation capacitors CT1–CT3. In this manner, a vertical read operation for the first row of effective pixels is performed.

Current signals output from the pixels 21 are determined depending on the element temperatures and the voltages at both the ends of the elements. However, since the potentials of the vertical read lines 2a–2c are reset to a potential such that the current signals corresponding to the background light components of the pixels are equal to ID, the voltages at both the ends are fixed. As a result, the current signals corresponding to an increase in temperature caused by infrared irradiation are output from the pixels 21, respectively.

During periods t21 to t23, the voltage signals, which are accumulated in accumulation capacitors CT1–CT3, of the first row of effective pixels are sequentially read onto an output terminal VO through a horizontal read line 13, and a horizontal reading operation for the first row of effective pixels is performed. At the same time, a vertical reading operation of the second row of effective pixels is performed.

The horizontal reading operation for the first row of effective pixels and the vertical reading operation for the second row of effective pixels during periods t21 to t23 described above are similarly performed during periods t31 to t33 for a horizontal reading operation of the second row of effective pixels and a vertical reading operation of the third row of effective pixels. In addition, a horizontal reading operation for the third row of effective pixels is similarly performed during periods t41 to t43, and the reading operations for all the pixels are completed.

Referring to FIG. 17, when a power supply voltage VRB and a reset voltage VR of the vertical read line are selected to satisfy VRB<VR, current signals ISD are read from the pixels 21. In this case, the Schottky barrier diodes SD can be biased in a forward direction.

It is known to those skilled in the art that "shot" noise is included in the current signal ISD of each pixel 21, and that the "shot" noise amplitude is in proportion to the square root of the current signal ISD. Therefore, when the Schottky barrier diodes of the pixels 21 are biased in the forward direction, the current signals ISD can be increased. However, since the "shot" noise increases by only a magnitude which is in proportion to the square root of the current signal, a signal/noise ratio may still be increased.

Also, as discussed above in relation to previous embodiments of the present invention when the potentials of vertical read lines vary by pixel columns, the background light current signals ID vary by pixel columns, so that so-called fixed-pattern noise may be generated. However, according to the present invention, after the potentials of the vertical read lines are reset to a potential such that the background light current signals of the pixels are equal to ID, the current signals are output. For this reason, the background light current signals ID do not vary by pixel columns, and fixed-pattern noise is not generated.

In general, internal resistors are serially present in diodes. For this reason, when a vertical read operation and a horizontal read operation are simultaneously performed as in the prior art, it may be impossible to perform a high-speed reading operation under the influence of the internal resistances of Schottky barrier diodes SD of pixels 21 and the parasitic capacitors of the vertical read lines. However, in this embodiment, the vertical read operation and the horizontal read operation for the pixels 21 are entirely independently performed. For this reason, the Schottky barrier diodes SD of the pixels 21 include internal resistors, the reading operation is performed at a high speed.

In this case, after the background light current signal ID is removed from the synthesized current signal (ID+IS), only the current signal IS is integrated. The gain of the integration circuit can be increased regardless of the background light component. A plurality of horizontal read lines need not be arranged, and the cost of the sensor is reduced.

Figure 18:
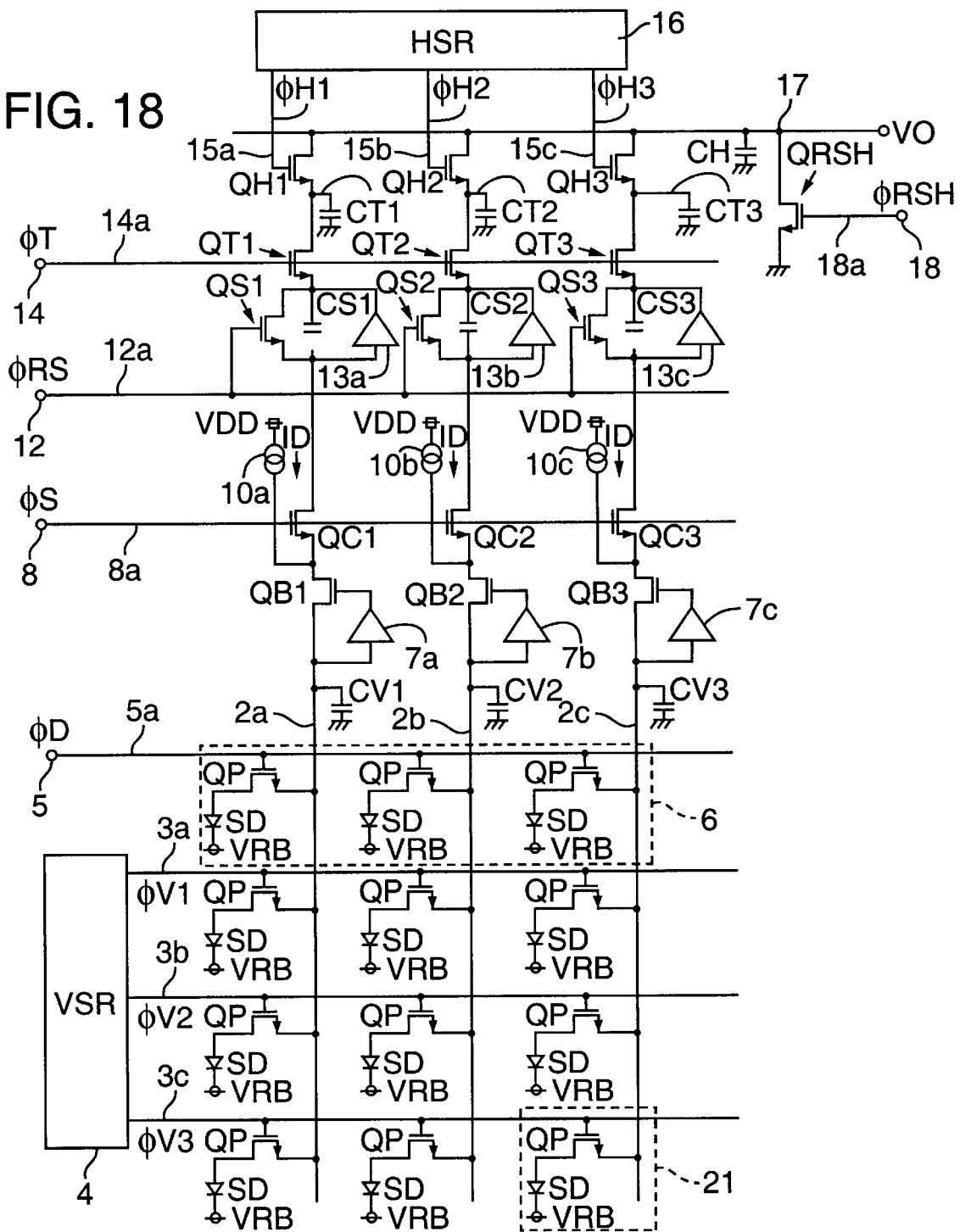
FIG. 18 is a schematic block circuit diagram of a ninth representative embodiment of the thermal infrared image sensor of the present invention.

FIG. 18 shows a thermal infrared image sensor according to the tenth representative embodiment of the present invention. The ninth and tenth embodiments differ in that a current-bias device also serves as the background-removing device. Again, identical reference numerals are used for identical features of the sensors.

In the thermal infrared image sensor shown in FIG. 18, although the current-bias device also serves as the background light removing device, the operation of the current-bias device is described by using a pulse timing chart shown in FIG. 16 in the same manner as in the ninth embodiment.

As shown in FIG. 16, a drive pulse φS is set to a low level during periods t11, t21, and t31 to turn transistors QC1–QC3 on, and the drive pulse φS is set to a high level during periods t12, t22, and t32 to turn the transistors QC1–QC3 on. Therefore, as in the ninth embodiment, only a signal component, that is free from a background light component and corresponds to an increase in temperature caused by infrared irradiation, is output.

Since the current-bias device and the background light removing device are constituted by the same circuit, the circuit is reduced in scale.

In the ninth and tenth embodiments, the thermosensing elements are described as Schottky barrier diodes. However, as described above for other representative embodiments of the present invention, the elements may similarly be p-n junction diodes or the like.

As has been described above, according to the present invention, after output currents from pixels are integrated by an integration circuit through a buffer amplifier, the output currents are temporarily accumulated in an accumulator. For this reason, a vertical reading operation and a horizontal reading operation are independently performed. The thermal infrared image sensor is not adversely affected by the time constant between the resistor components of pixels and the parasitic capacitors of read lines, and reading speed is increased.

According to the present invention, even if the resistances of the bolometers constituting the pixels are increased to suppress heat generation by the thermosensing elements, a high-speed reading operation is achieved, and noise generated by the pixels is reduced. Additionally, after the background light components are removed, only the current signals are integrated. For this reason, the gain of the integration circuit can be increased regardless of the background light components.

Moreover, since the respective pixels of the sensor of the present invention are biased by a constant current in advance such that the current outputs corresponding to the background light components of the pixels are constant, the background light components of the pixels do not vary, and fixed-pattern noise is not generated.

Furthermore, since diodes can be used as thermosensing elements of the pixels in the present invention, the device need not consist of a special material, and heat generation by the elements is negligible. A thermal infrared image sensor having high sensitivity and a high-speed reading operation is realized.

According to the present invention, the diodes of the pixels can also be biased in a forward direction to output current signals. In this case, the current signals are larger than those obtained by biasing diodes in a reverse direction. Therefore, large voltage signals are obtained, sensitivity is improved, and the signal/noise ratio increases. Additionally, the diodes of the pixels can also be constituted by Schottky barrier diodes. Since diffusion can be reduced in thickness, the total thickness of the pixels is reduced, heat capacity of the pixels is reduced, and sensitivity improved.

Having illustrated and described the principles of the invention with multiple preferred embodiments and multiple various examples, it should be apparent to those skilled in the art that the invention can be modified in arrangement and detail without departing from such principles. We claim all the modifications coming within the spirit and scope of the following claims.

What is claimed is:

1. A thermal infrared image sensor comprising:
   (a) a plurality of pixels, each pixel comprising a thermosensing element for conducting current;
   (b) a plurality of read lines each connected to a predetermined number of the thermosensing elements;
   (c) each pixel further including a pixel switch connected to the respective thermosensing element and to a respective read line, the pixel switch allowing current to flow from the thermosensing element to the read line whenever the pixel switch is on, and the pixel switch preventing current from flowing from the thermosensing element to the read line whenever the pixel switch is off;
   (d) a parallel read device connected to the read lines and operable to read current signals conducted by the thermosensing elements;
   (e) a first accumulator operable to accumulate current signals read by the parallel read device; and
   (f) a serial scan device operable to sequentially and serially read current signals accumulated by the first accumulator.

2. The thermal infrared image sensor of claim 1, wherein the plurality of pixels are arranged in rows and columns forming a two-dimensional matrix of pixels.

3. The thermal infrared image sensor of claim 2, wherein the plurality of read lines comprises vertical read lines, and wherein each vertical read line is connected to a column of pixels.

4. The thermal infrared image sensor of claim 3, wherein the parallel read device comprises a vertical reading circuit operable to extract, in parallel, current signals of rows of pixels from the vertical read lines, and to output current signals.

5. The thermal infrared image sensor of claim 4, wherein the serial scanner comprises a horizontal scan device operable to sequentially and serially read current signals accumulated by the first accumulator.

6. The thermal infrared image sensor of claim 5, wherein the vertical reading circuit comprises a current-voltage conversion circuit operable to convert current signals received from the thermosensing elements into corresponding voltage signals.

7. The thermal infrared image sensor of claim 6, wherein the current-voltage conversion circuit comprises a resettable integration circuit operable to convert current signals received from the thermosensing elements into corresponding voltage signals, and to reset the potential of the current-voltage conversion circuit to a preselected potential.

8. The thermal infrared image sensor of claim 7, wherein the current-voltage conversion circuit further comprises a second accumulator connected to a vertical read line, the second accumulator being operable to accumulate, in parallel, signals received from a next row of pixels while the horizontal scan device sequentially reads signals of a previous row of pixels from the first accumulator.

9. The thermal infrared image sensor of claim 7, further comprising a transfer switch connected between the resettable integration circuit and the first accumulator, wherein the transfer switch is operable to cause the horizontal scan device to sequentially and serially read signals accumulated by the first accumulator.

10. The thermal infrared image sensor of claim 6, wherein in the vertical reading circuit further comprises:
 (a) a resettable integration circuit;
 (b) a second accumulator operable to accumulate a row of pixel signals converted by the current-voltage conversion circuit while the horizontal scan device sequentially and serially reads a previous row of pixel signals from the first accumulator; and
 (c) wherein the vertical reading circuit is operable to read, in parallel, a next row of pixels to the second accumulator while the horizontal scan device sequentially and serially reads a previous row of pixel signals from the first accumulator.

11. The thermal infrared image sensor of claim 5, further comprising a plurality of second accumulators connected to the vertical read lines, the plurality of second accumulators being operable to accumulate, in parallel, signals received from a next row of pixels while the horizontal scan device sequentially reads signals of a previous row of pixels from the first accumulator.

12. The thermal infrared image sensor of claim 1, where in the current levels that flow through the thermosensing elements vary with changes in temperature caused by infrared irradiation.

13. The thermal infrared image sensor of claim 1, wherein each thermosensing element comprises a bolometer.

14. The thermal infrared image sensor of claim 1, wherein each thermosensing element comprises a diode.

15. The thermal infrared image sensor of claim 1, wherein each thermosensing element comprises a bolometer and a diode.

16. A thermal infrared image sensor comprising:
 (a) a plurality of pixels arranged in columns and rows, each pixel comprising a thermosensing element for conducting current, wherein current levels that flow through the thermosensing element vary with changes in temperature of the pixel;
 (b) a plurality of vertical read lines each connected to a respective column of pixels;
 (c) each pixel further including a first switch connected to the thermosensing element and to a respective vertical read line, the first switch allowing current to flow from the thermosensing element to the vertical read line whenever the first switch is on, and the first switch preventing current from flowing from the thermosensing element to the vertical read line whenever the first switch is off;
 (d) a plurality of second switches each connected to a respective vertical read line;
 (e) a vertical reading circuit for sequentially controlling the first switches by rows of pixels;
 (f) a plurality of current-voltage conversion circuits, each current-voltage conversion circuit being connected to a respective vertical read line through the respective second switch, each current-voltage conversion circuit converting current signals of the respective row of pixels to corresponding voltage signals whenever the respective second switch is turned on;
 (g) a plurality of first accumulators, each first accumulator being connected to a respective current-voltage conversion circuit to accumulate voltage signals output from the current-voltage conversion circuit;
 (h) a plurality of transfer switches, each transfer switch being connected between a respective current-voltage conversion circuit and a respective first accumulator, wherein the transfer switch may be in an ON state to allow voltage signals to flow from the respective current-voltage conversion circuit to the respective first accumulator, and wherein the transfer switch may be in an OFF state to prevent voltage signals from flowing from the respective current-voltage conversion circuit to the respective first accumulator;
 (i) horizontal read switches to sequentially and serially output the voltage signals accumulated in the first accumulators; and
 (j) a horizontal scanning circuit to sequentially control the horizontal read switches.

17. The thermal infrared image sensor of claim 16, wherein each current-voltage conversion circuit comprises a resettable integration circuit.

18. The thermal infrared image sensor of claim 16, wherein each current-voltage conversion circuit comprises a second accumulator for accumulating the respective converted voltage signals, wherein the horizontal read switch sequentially and serially outputs signals from the first accumulator whenever the transfer switch is in an off state, and current signals of a next row of pixels are simultaneously converted into voltage signals and accumulated by each current-voltage conversion circuit.

19. The thermal infrared image sensor of claim 18, wherein each current-voltage conversion circuit further comprises a resettable integration circuit.

20. The thermal infrared image sensor of claim 16, wherein each thermosensing element comprises a bolometer.

21. The thermal infrared image sensor of claim 16, wherein each thermosensing element comprises a diode.

22. The thermal infrared image sensor of claim 16, wherein each thermosensing element comprises a bolometer and a diode.

23. A thermal infrared image sensor comprising:
 (a) a plurality of pixels, each pixel comprising a thermosensing element to output current signals that vary with changes in temperature of the pixel;
 (b) a plurality of read lines, each read line being connected to a predetermined number of respective pixels;
 (c) a plurality of buffer amplifiers, each buffer amplifier being connected to a respective read line to output current signals received from the respective pixels;
 (d) an offset compensator for compensating for offsets inherent in the buffer amplifiers;
 (e) a plurality of integration circuits to integrate current signals received from the buffer amplifiers and to output voltage signals corresponding to the current signals; and
 (f) a serial scanner to sequentially and serially read the voltage signals from the integration circuits.

24. The thermal infrared image sensor of claim 23, wherein the plurality of pixels are arranged in rows and columns forming a two-dimensional matrix of pixels.

25. The thermal infrared image sensor of claim 24, wherein the plurality of read lines comprises vertical read lines, and wherein each vertical read line is connected to a respective column of pixels.

26. The thermal infrared image sensor of claim 25, wherein the serial scanner comprises a horizontal scan device operable to sequentially and serially read voltage signals obtained by the integration circuits.

27. The thermal infrared image sensor of claim 26, further comprising a plurality of first accumulators to accumulate the voltage signals from the respective integration circuits.

28. The thermal infrared image sensor of claim 27, further comprising a plurality of transfer switches, each transfer switch being connected between a respective integration circuit and a respective first accumulator, wherein whenever a transfer switch is turned on, voltage signals from a respective integration circuit are accumulated in a respective first accumulator.

29. The thermal infrared image sensor according to claim 28, wherein each of the plurality of buffer amplifiers comprises a constant-current transistor comprising a main current path connected between a respective vertical read line and a respective integration circuit.

30. The thermal infrared image sensor according to claim 29, wherein each of the plurality of buffer amplifiers comprises an amplifier for inverting a signal from the vertical read line to supply the inverted signal to a control electrode of the constant-current transistor.

31. The thermal infrared image sensor according to claim 27, wherein the horizontal scan device sequentially and serially reads voltage signals accumulated in the first accumulator.

32. The thermal infrared image sensor according to claim 25, wherein the offset compensator comprises a reset switch to reset a potential of the vertical read line to a preselected potential.

33. The thermal infrared image sensor according to claim 25, further including a vertical reading circuit for sequentially selecting and scanning rows of pixels.

34. The thermal infrared image sensor of claim 23, wherein each thermosensing element comprises a bolometer.

35. The thermal infrared image sensor of claim 23, wherein each thermosensing element comprises a diode.

36. The thermal infrared image sensor of claim 35, wherein the diodes are biased in a forward direction.

37. The thermal infrared image sensor of claim 35, wherein each thermosensing element comprises a Schottky barrier diode.

38. The thermal infrared image sensor of claim 23, wherein each thermosensing element further comprises a bolometer and a diode.

39. A thermal infrared image sensor comprising:
(a) a plurality of pixels, each pixel comprising a thermosensing element to output current signals that vary with changes in temperature;
(b) a plurality of read lines, each read line being connected to a predetermined number of respective pixels;
(c) a plurality of buffer amplifiers each being connected to a respective read line to output current signals received from the respective pixels;
(d) a plurality of current bias devices, each current bias device being operable to bias each pixel through the respective buffer amplifiers;
(e) a background-light removing device for removing current components of the pixel current signal that correspond to background light received by the respective pixel;
(f) a plurality of integration circuits for integrating currents output from the respective buffer amplifiers, after the respective current components corresponding to background light are removed, to output respective voltage signals; and
(g) a serial scanner for sequentially and serially reading the current signals output from the integration circuit.

40. The thermal infrared image sensor of claim 39, wherein the current signals output from the thermosensing elements vary with temperature changes caused by infrared irradiation incident on the thermosensing elements, and wherein the pixels are arranged in a two-dimensional matrix of rows and columns of pixels.

41. The thermal infrared image sensor of claim 40, wherein the plurality of read lines comprises vertical read lines, and wherein each vertical read line is connected to a respective column of pixels.

42. The thermal infrared image sensor of claim 41, wherein the pixels on at least one row of the matrix are dummy pixels that are shielded from infrared irradiation, wherein a row of the dummy pixels may be independently selected such that each of the plurality of current bias devices causes a predetermined bias current to flow in the dummy pixels such that current signals corresponding to the background-light components of the pixels in the selected pixel row are equal to the preselected bias current.

43. The thermal infrared image sensor of claim 42, wherein each of the plurality of current bias devices includes a first current source connected to an output of each of the plurality of buffer amplifiers through a switch.

44. The thermal infrared image sensor of claim 43, wherein the background light removing device includes a second current source connected to the output of the buffer amplifier through a switch operated with the switch of each of the plurality of current bias devices.

45. The thermal infrared image sensor of claim 44, wherein current values of the first current source and the second current source are correlated with each other.

46. The thermal infrared image sensor of claim 45, wherein the current value of the first current source and the current value of the second current source are equal, or wherein the current value of the first current source is greater than the current value of the second current source.

47. The thermal infrared image sensor of claim 46, wherein each of the plurality of current bias devices also functions as the background-light removing device.

48. The thermal infrared image sensor of claim 39, further comprising a plurality of first accumulators each being operable to accumulate the respective voltage signals from the respective integration circuit.

49. The thermal infrared image sensor of claim 48, wherein the serial scanner comprises a horizontal scan device operable to sequentially and serially read current signals accumulated by the first accumulator.

50. The thermal infrared image sensor of claim 39, further including a plurality of transfer switches each being connected between a respective integration circuit and a respective first accumulator, wherein whenever a transfer switch is turned on, voltage signals from a respective integration circuit are accumulated in a respective first accumulator.

51. The thermal infrared image sensor of claim 39, wherein each buffer amplifier comprises a constant-current transistor comprising a main current path connected to a corresponding vertical read line and an amplifier for inverting a signal from the vertical read line to supply the inverted signal to a control electrode of the constant-current transistor.

52. The thermal infrared image sensor of claim 39, further including a vertical reading circuit for sequentially selecting and scanning rows of pixels.

53. The thermal infrared image sensor of claim 39, wherein each pixel further includes a pixel switch connected to a respective thermosensing element and to a respective read line, wherein the pixel switch allows current to flow from the respective thermosensing element to the respective read line whenever the pixel switch is on and wherein the pixel switch prevents current from flowing from the thermosensing element to the respective read line whenever the pixel switch is off.

54. The thermal infrared image sensor of claim 39, wherein each thermosensing element comprises a bolometer.

55. The thermal infrared image sensor of claim 39, wherein each thermosensing element comprises a diode.

56. The thermal infrared image sensor of claim 55, wherein each diode is biased in a forward direction.

57. The thermal infrared image sensor of claim 55, wherein each thermosensing element further comprises a bolometer and a diode.

58. The thermal infrared image sensor of claim 39, wherein each thermosensing element comprises a Schottky barrier diode.

* * * * *

UNITED STATES PATENT AND TRADEMARK OFFICE
CERTIFICATE OF CORRECTION

PATENT NO.   : 5,952,659
DATED        : September 14, 1999
INVENTOR(S)  : Yoneyama et al.

It is certified that error appears in the above-identified patent and that said Letters Patent is hereby corrected as shown below:

Column 3,
Line 9, "QH1-QH3" should be -- $\Phi$H1-$\Phi$H3 --.

Column 15,
Line 34, "ART" should be -- $\Phi$RT --.

Column 17,
Line 33, the second occurrence of "are" should be deleted.
Line 58, "10a-101" should be -- 10a-10c --.

Column 23,
Line 54, "AD" should be -- $\Phi$D --.

Column 24,
Lines 26 and 27, the first occurrence of "constant current" should be -- constant-current --.

Column 26,
Line 55, "constant current" should be -- constant-current --.

Column 27,
Line 66, "constant current" should be -- constant-current --.

Column 28,
Lines 10 and 30, "constant current" should be -- constant-current --.

UNITED STATES PATENT AND TRADEMARK OFFICE
CERTIFICATE OF CORRECTION

PATENT NO. : 5,952,659
DATED : September 14, 1999
INVENTOR(S) : Yoneyama et al.

It is certified that error appears in the above-identified patent and that said Letters Patent is hereby corrected as shown below:

Claims:

Column 33,
Lines 7 and 8, claim 10, "where in" should be -- wherein --.
Lines 27 and 28, claim 12, "where in" should be -- wherein --.

Column 38,
Line 3, claim 57, "claim 55" should be -- claim 39 --.
Line 6, claim 58, "claim 39" should be -- claim 55 --.

Signed and Sealed this

Ninth Day of October, 2001

Attest:

NICHOLAS P. GODICI
Attesting Officer    Acting Director of the United States Patent and Trademark Office